US010641443B2

(12) United States Patent
Brennenstuhl

(10) Patent No.: US 10,641,443 B2
(45) Date of Patent: May 5, 2020

(54) LUMINAIRE ARRANGEMENT

(71) Applicant: Nimbus Group GmbH, Stuttgart (DE)

(72) Inventor: Dietrich Brennenstuhl, Stuttgart (DE)

(73) Assignee: NIMBUS GROUP GMBH, Stuttgart (DE)

( * ) Notice: Subject to any disclaimer, the term of this patent is extended or adjusted under 35 U.S.C. 154(b) by 230 days.

(21) Appl. No.: 15/425,932

(22) Filed: Feb. 6, 2017

(65) Prior Publication Data

US 2017/0261163 A1    Sep. 14, 2017

(30) Foreign Application Priority Data

Mar. 11, 2016 (DE) .................... 20 2016 101 368 U

(51) Int. Cl.
*F21L 4/00* (2006.01)
*F21L 4/08* (2006.01)
(Continued)

(52) U.S. Cl.
CPC ...... *F21L 4/08* (2013.01); *F21L 2/00* (2013.01); *F21S 6/006* (2013.01); *F21S 9/02* (2013.01);
(Continued)

(58) Field of Classification Search
CPC ........ F21L 4/08; F21L 4/04; F21L 2/00; H02J 9/065; H02J 7/35; H02J 7/0042;
(Continued)

(56) References Cited

U.S. PATENT DOCUMENTS 4,029,954 A * 6/1977 Moyer .................... F21L 4/085
320/115
6,160,355 A    12/2000 Yee
(Continued)

FOREIGN PATENT DOCUMENTS

CN    202902002 U    4/2013
JP    H06333677 A    12/1994
(Continued)

OTHER PUBLICATIONS

European Search Report for EP16182925.4 dated Jan. 3, 2017, 11 pages.

*Primary Examiner* — William J Carter
*Assistant Examiner* — Omar Rojas Cadima
(74) *Attorney, Agent, or Firm* — Reising Ethington, P.C.

(57) ABSTRACT

A luminaire arrangement for providing lighting in or near buildings. The luminaire arrangement may contain one or more of the following components: (i) at least one portable luminaire, which has a body and a lamp arrangement, (ii) at least one energy store, which is connected to the luminaire, is rechargeable, and is designed to supply electrical power to the lamp arrangement of the luminaire; and (iii) at least one charging device, which is designed to recharge the energy store. The energy store is attachable by means of an interface arrangement to the charging device in order to at least one of recharge the energy store and supply power to the lamp arrangement. The energy store is separable from the charging device in order to take the luminaire as necessary to any target location to be lit.

7 Claims, 9 Drawing Sheets

(51) Int. Cl.
*F21V 23/06* (2006.01)
*F21S 6/00* (2006.01)
*F21L 2/00* (2006.01)
*F21S 9/02* (2006.01)
*H02J 50/10* (2016.01)
*H02J 7/35* (2006.01)
*H02J 9/06* (2006.01)
*H05B 45/10* (2020.01)
*H05B 47/19* (2020.01)
*F21V 21/096* (2006.01)
*F21V 21/26* (2006.01)
*F21V 23/04* (2006.01)
*H02J 7/00* (2006.01)
*H02J 7/02* (2016.01)
*F21S 8/00* (2006.01)
*F21V 21/30* (2006.01)
*F21V 21/40* (2006.01)
*F21V 21/28* (2006.01)
*F21L 4/04* (2006.01)
*F21Y 115/10* (2016.01)

(52) U.S. Cl.
CPC .......... *F21V 21/0965* (2013.01); *F21V 21/26* (2013.01); *F21V 23/0485* (2013.01); *F21V 23/06* (2013.01); *H02J 7/0042* (2013.01); *H02J 7/025* (2013.01); *H02J 7/35* (2013.01); *H02J 9/065* (2013.01); *H02J 50/10* (2016.02); *H05B 45/10* (2020.01); *H05B 47/19* (2020.01); *F21L 4/04* (2013.01); *F21S 6/00* (2013.01); *F21S 8/00* (2013.01); *F21V 21/28* (2013.01); *F21V 21/30* (2013.01); *F21V 21/40* (2013.01); *F21Y 2115/10* (2016.08); *Y02B 10/72* (2013.01)

(58) Field of Classification Search
CPC ...... H02J 7/025; H02J 50/10; H05B 33/0845; H05B 37/0272; Y02B 10/72; F21Y 2115/10; F21V 21/26; F21V 21/0965; F21V 23/0485; F21V 23/06; F21V 21/30; F21V 21/40; F21V 21/28; F21S 8/00; F21S 6/006; F21S 6/00; F21S 9/02
See application file for complete search history.

(56) References Cited

U.S. PATENT DOCUMENTS

| 6,479,965 B2 * | 11/2002 | Barbeau | F21L 2/00 |
| | | | 320/115 |
| 2006/0262525 A1 | 11/2006 | Barbeau | |
| 2009/0212637 A1 * | 8/2009 | Baarman | H01F 7/0247 |
| | | | 307/104 |
| 2010/0039792 A1 | 2/2010 | Meyers | |
| 2016/0254616 A1 | 9/2016 | Kim | |
| 2017/0338684 A1 * | 11/2017 | Mishriki | H02J 7/0013 |

FOREIGN PATENT DOCUMENTS

| JP | 2004273307 A | 9/2004 |
| WO | WO2006053918 A1 | 5/2006 |
| WO | WO2015069053 A1 | 5/2015 |

* cited by examiner

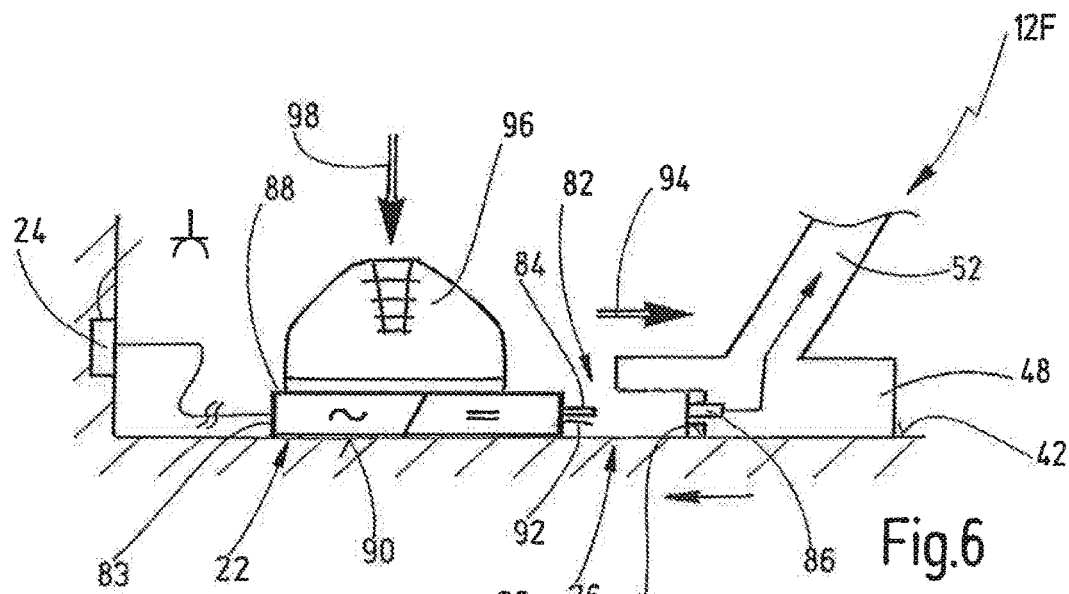
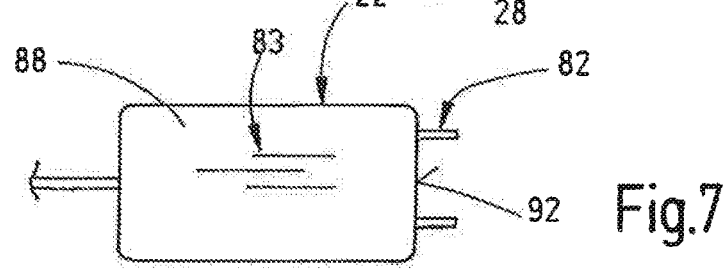
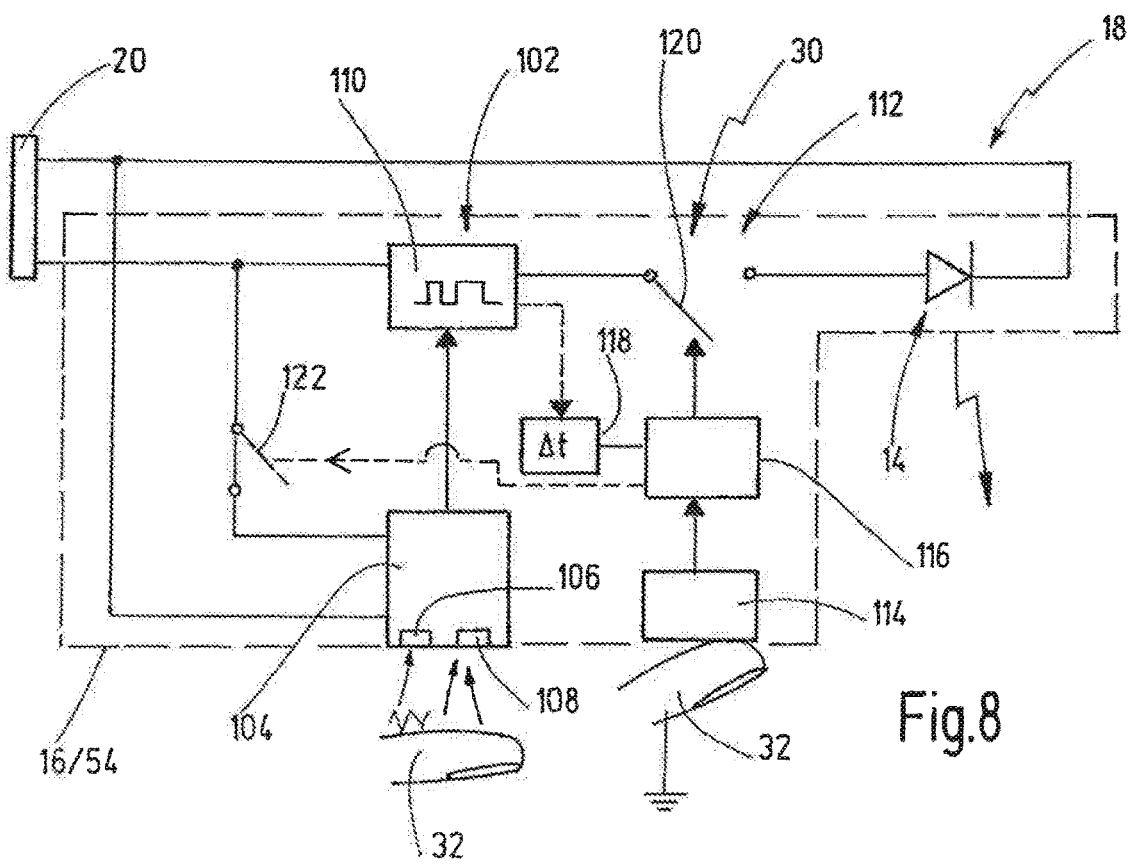

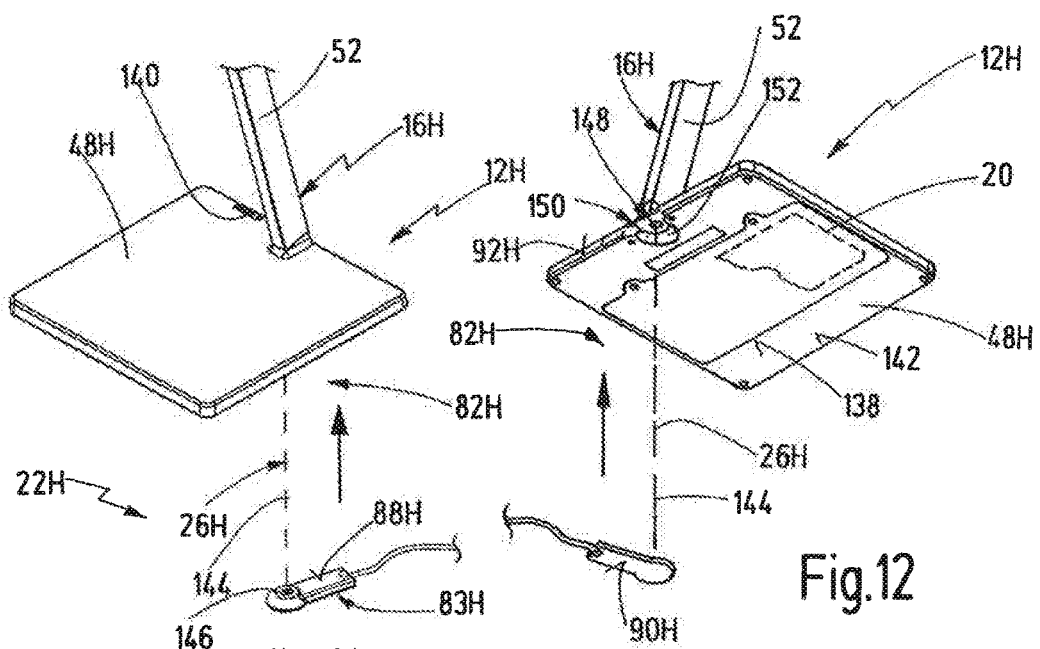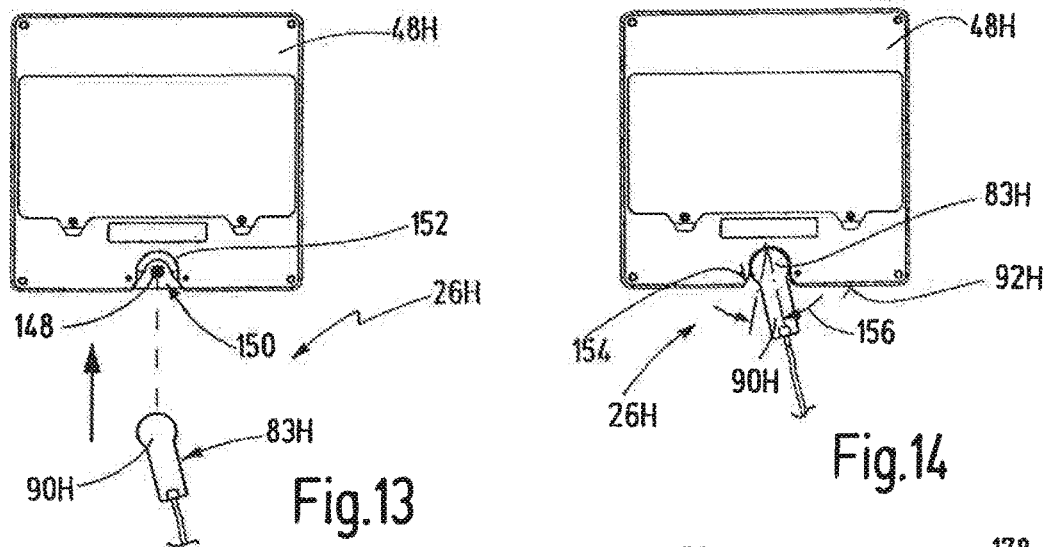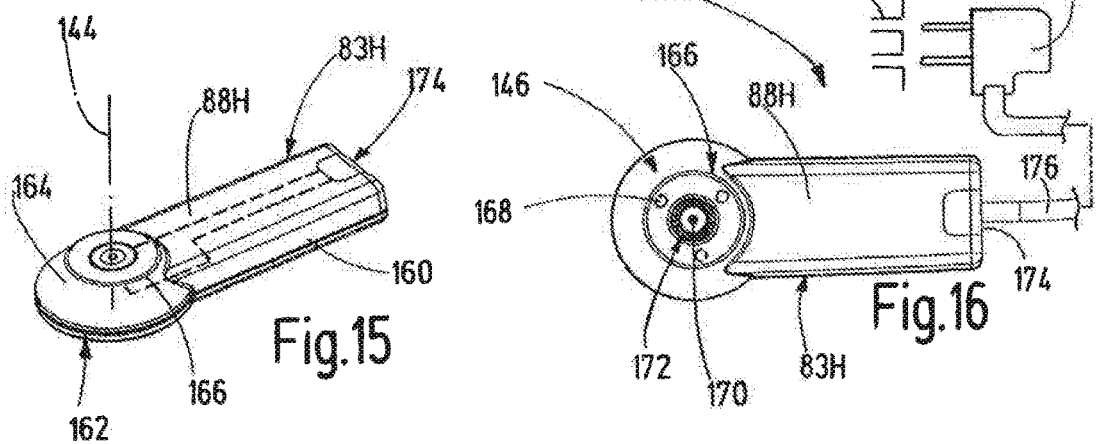

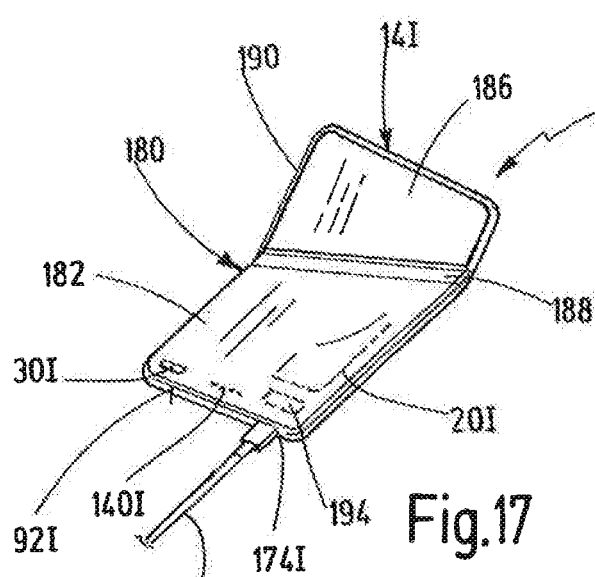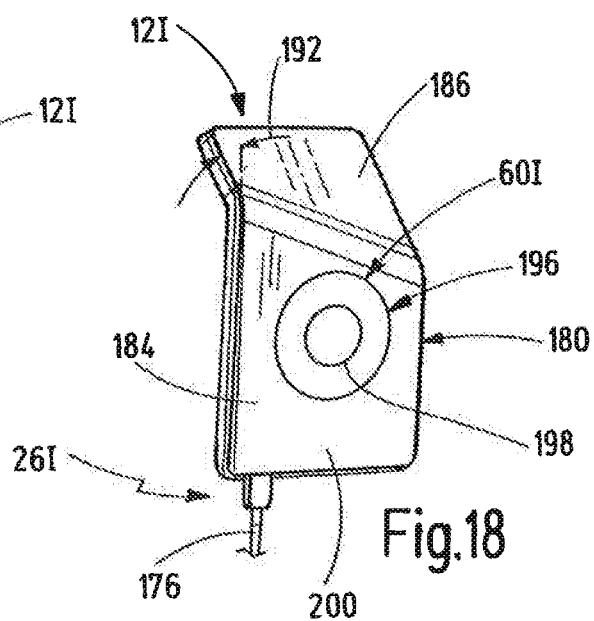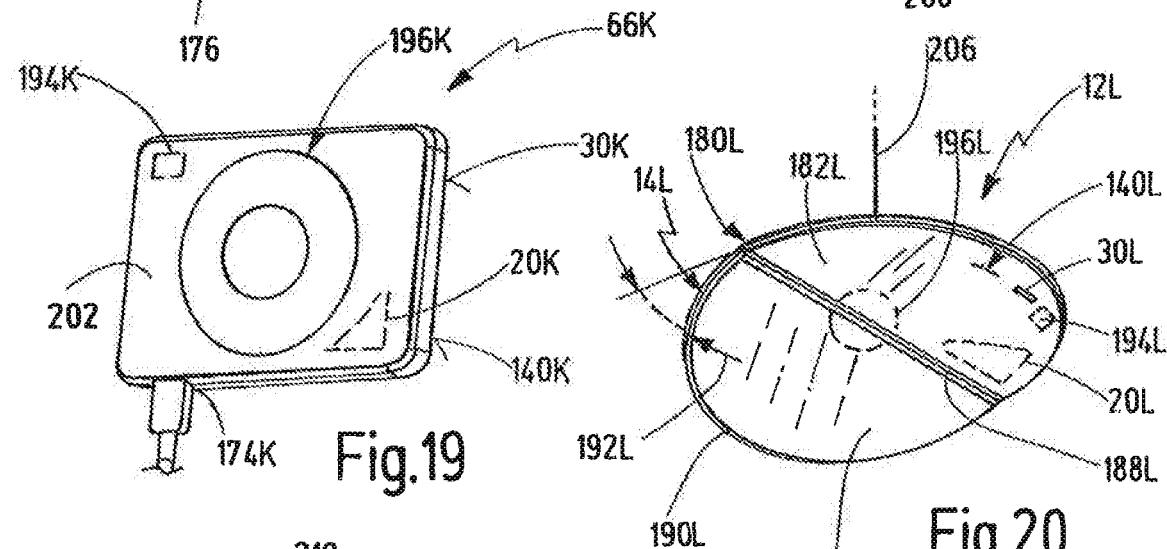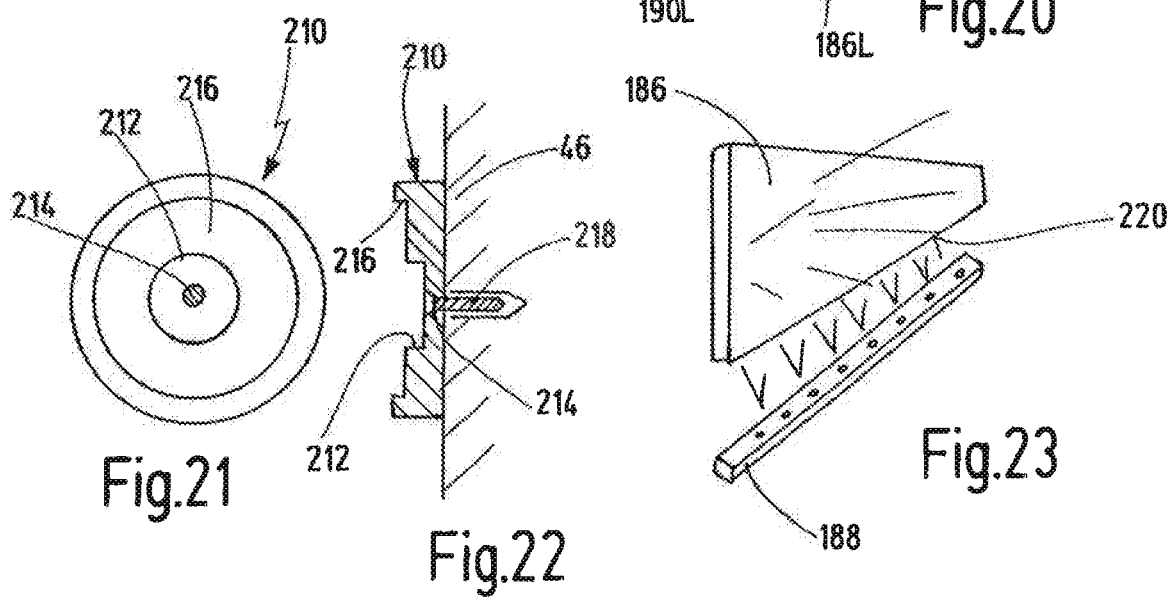

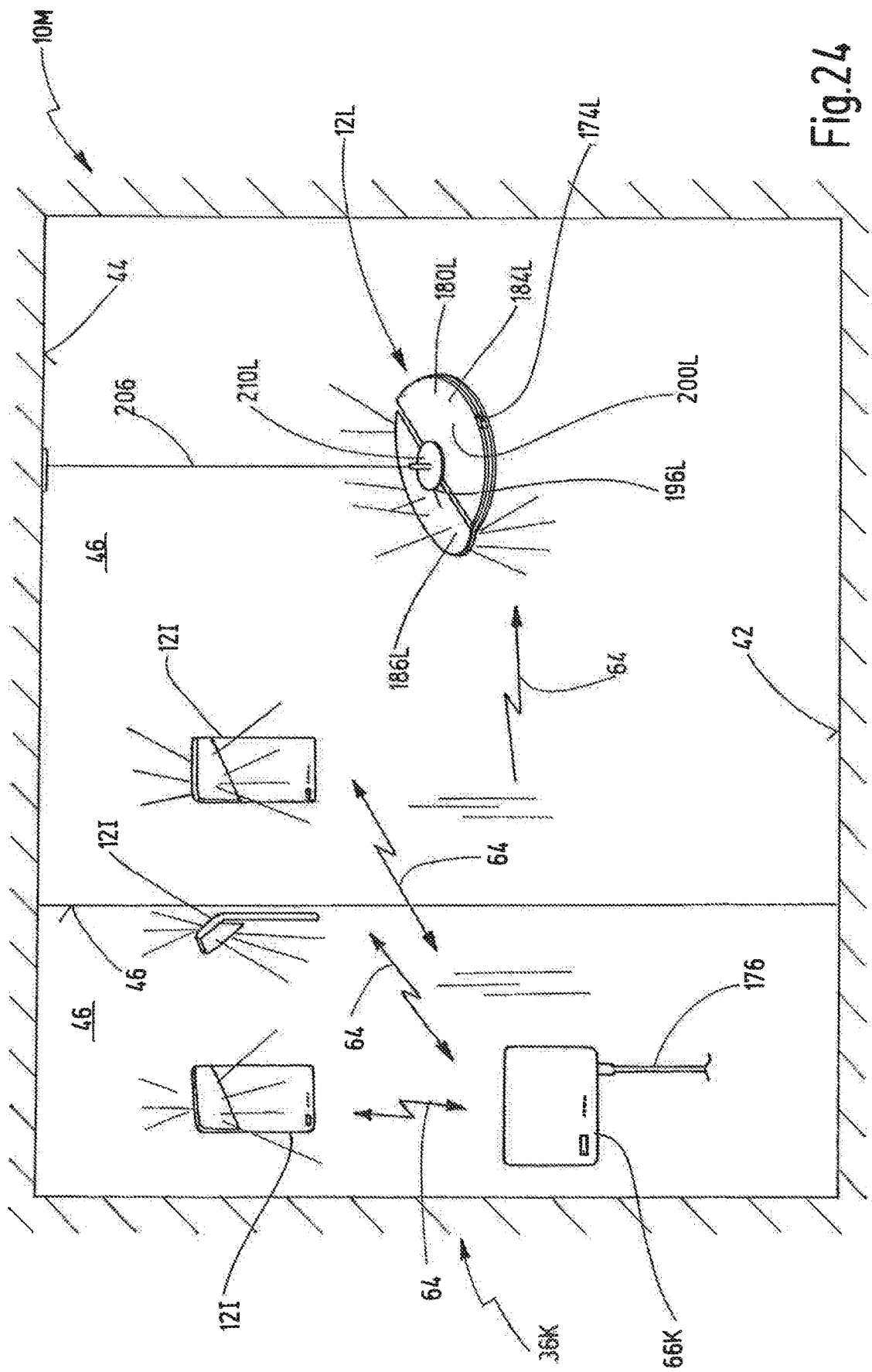

LUMINAIRE ARRANGEMENT

CROSS-REFERENCE TO RELATED APPLICATIONS

This application claims the priority of German utility model application DE 20 2016 101 368.2, filed Mar. 11, 2016, wherein the entire content of this application is incorporated herein by reference.

BACKGROUND

The above-mentioned invention relates to a luminaire arrangement, in particular for providing lighting in or near buildings, the luminaire arrangement having a luminaire which includes a body and a lamp arrangement.

The lamp arrangement preferably includes one or more lamps having a low power consumption, such as an LED lamp arrangement. The lamp arrangement can be constructed in particular in the form of an array of lamps of this type. The luminaire also includes a body, to which the lamp arrangement is fixed.

Luminaire arrangements of this type are known as wall, table, ceiling or floor luminaires, to name a few examples. The lamp arrangement is generally electrically operated. Here, it is known to connect the lamp arrangement to a main power supply or another power source. For this purpose, suitable electrical lines can be laid in the body. However, it is also known to operate lamp arrangements of this type using rechargeable, secondary batteries or using primary batteries.

SUMMARY

On this basis, an object of the design is to specify an improved luminaire arrangement, an improved luminaire, an improved charging device, and also an improved method for operating a luminaire arrangement of this type.

The above problem is achieved by a luminaire arrangement, in particular for lighting in or near buildings, the luminaire arrangement containing one or more of the following components:
  at least one portable luminaire, which has a body and a lamp arrangement,
  at least one energy store, which is connected to the luminaire, is rechargeable, and is designed to supply electrical power to the lamp arrangement of the luminaire, and
  at least one charging device, which is designed to recharge the energy store,
  wherein the energy store being attachable by means of an interface arrangement to the charging device in order to recharge the energy store and/or in order to supply power to the lamp arrangement, and being separable from the charging device in order to take the luminaire as necessary to any target location to be lit.

With the luminaire arrangement according to the present design, a completely new type of lighting concept is provided. The basic concept lies in designing a luminaire so as to be portable and either attaching the luminaire to a charging device in order to recharge an energy store connected to the luminaire, or separating the luminaire from the charging device in order to take the luminaire as necessary to any location to be lit.

Consequently, by means of the portable luminaire, lighting can be provided in a mobile manner wherever it is currently required, for example for reading, for playing, for doing handicrafts, for activities performed by craftsmen, etc.

The portable luminaire here can be, in particular, a freestanding luminaire, but also a wall luminaire, a table luminaire, or a ceiling luminaire, to name a few examples. At the location to be lit, the portable luminaire can assume a normal operational position or operating position, which for example is a standing position, a leaning position, a plugged-in position or a hanging position. The charging process can be performed in the normal operational position. In a variant, however, it is preferably for the portable luminaire to be removed from the normal operational position in order to carry out a charging process. The normal operational position is preferably a position in which there is no main power supply connection provided by means of which the portable luminaire could be supplied with power.

The portable luminaire can be arranged in an indoors space for charging and can be taken outside to light a location, for example in a garden.

The lamp arrangement preferably has a power consumption that is less than 15 watts, in particular less than 10 watts. The lamp arrangement is preferably also designed to generate a luminous flux in a range of from 200 lm to 2,000 lm.

The rechargeable energy store preferably has a capacity in a range of from 2,000 mAh to 20,000 mAh.

The charging device can preferably be attached to a main power supply, such as a 220-volt grid, but can also be connected to a photovoltaic arrangement as power source.

The portable luminaire preferably has a weight in a range of from 500 g to 8,000 g, in particular in a range of from 1,000 g to 5,000 g. The luminaire also preferably has dimensions similar to conventional furniture luminaires.

The luminaire, in one embodiment, has dimensions such that it cannot be placed in a pocket of an item of clothing.

The body of the portable luminaire can be a housing of which the walls can be at least partially permeable to light. The body can be a one-piece rigid body, but can also be a multi-part body. In particular, the body can include a foot, which is connected to a main body, such as an arm or the like. The body can also have a head, which for example is connected to an arm or a pillar. It is particularly preferred if an arm or a pillar of a freestanding luminaire is rigidly connected to a foot, wherein a head can be mounted in an articulated manner on the arm or the pillar, the lamp arrangement being fixed to the head.

An interface of the interface arrangement is preferably also provided on the body. The interface on the body can be a standard interface, in particular a standard computer interface, such as a USB interface, a mini USB interface, or the like. Standard interfaces of this type generally include at least two DC contacts for providing a DC voltage, which can be used, preferably directly, to charge an electrical energy store inside the body, for example a voltage in a range of from 4 volts to 24 volts, i.e. a voltage as is also used for example to charge rechargeable batteries for mobile telephones.

The rechargeable electrical energy store of the luminaire arrangement preferably provides a DC voltage in a similar value range, this DC voltage being converted, where appropriate, by means of a converter circuit provided in the body to a voltage that is suitable for LED lamps, i.e. in particular a voltage of 12 volts or a voltage of 24 volts. In some embodiments the energy store can also provide a voltage of this type on the output side as standard.

A switching arrangement is preferably also provided on the body, by means of which switching arrangement the lamp arrangement can be switched on and switched off. The switching arrangement preferably includes a dimming device so as to be able to adjust the power consumption as necessary. The switching arrangement can include a contactless switch with or without dimmer.

The luminaire arrangement can include an individual portable luminaire, but can also include a plurality of portable luminaires.

The above object is also achieved by a method for operating a luminaire arrangement which comprises a portable luminaire having a lamp arrangement, an energy store, and a charging device, which can be connected to the energy store in order to charge the energy store, in particular in order to operate a luminaire arrangement of the type according to the present design, said method having the following steps: recharging the energy store by means of the charging device whilst the charging device is coupled to the energy store; detecting whether the energy store is coupled to the charging device; and, if the energy store is decoupled from the charging device, controlling the luminaire in such a way that power is supplied to the lamp arrangement.

In the present method according to the invention it is consequently detected whether the portable luminaire is connected to the charging device. As soon as the luminaire is decoupled from the charging device, power is supplied to the lamp arrangement so that the lamp arrangement can be used for lighting. Consequently, the luminaire can light up already on the way to a location to be lit and consequently can light the way for the person carrying the luminaire, for example.

The luminaire is switched on here preferably automatically once decoupled from the charging device, such that it is not necessary to actuate a switch of a switching arrangement or the like in order to switch on the luminaire.

The lamp arrangement is preferably switched off when the luminaire is coupled again to the charging device. On the other hand, it is preferable during a charging process if it is possible, during such a charging process (or when such a charging process is complete, but the luminaire is still connected to the charging device), to switch the luminaire on or off by means of a switching arrangement.

It is also conceivable for the luminaire to always be supplied with a small amount of power during a charging process so as to thus indicate that a charging process is underway. Only when the energy store is fully recharged can the power supply to the lamp arrangement be interrupted in this case. However, it is generally possible to also separate the luminaire from the power supply already prior to complete recharging. In an alternative embodiment it is possible to integrate a charge indicator in the body of the luminaire, for example on the upper side of a foot of the luminaire body, and/or on a head of the body.

If a state of charge indicator of this type is integrated, the following functions can also be provided in addition: By way of example, the state of charge or state of recharge indicator can be activated for a predetermined period of time (for example ranging from 2 seconds to 30 seconds) as soon as a user switches on the luminaire. The state of charge can thus be displayed to the user directly. Furthermore, provision can be made for the state of charge indicator to appear whenever the energy store is connected to the charging device, such that the state of charge indicator is activated during the entire charging process. The state of charge indicator can include, for example, a plurality of individual light-emitting diodes of different colors, which indicate the particular state of charge, more specifically preferably at least three LEDs for displaying a full energy store, a practically discharged energy store, and an energy store which is still sufficiently charged.

The above object is also achieved by a method for operating a luminaire arrangement which comprises a portable luminaire having a lamp arrangement, an energy store, and a charging device, which can be coupled to the energy store in order to charge the energy store, in particular a luminaire arrangement of the type according to the present design, said method having the following steps: detecting the state of charge of the energy store and reducing the light output of the lamp arrangement when the state of charge falls below a predetermined threshold value (for example 15% to 40% of a full charge), such that a power-saving mode is established; and/or detecting the state of charge of the energy store and gradually reducing the light output when the state of charge falls below a predetermined threshold value (for example 5% to 15% of a full charge), such that the nearing end of the energy store charge is displayed to a user; and/or providing a boost mode, by means of which the amount of light can be temporarily increased to approximately 101% to 150%, in particular 120% to 150% of a nominal power, the boost mode being automatically limited to a predetermined operating period, which is preferably shorter than 8 minutes.

With the luminaire according to the present design it is possible to provide a charging interface on the body for charging another mobile device, for example a smartphone or another USB device. A capacity of the energy store of the luminaire can thus be used to recharge another electronic device. If the state of charge falls below a specific threshold value, this function can preferably be switched off for reasons of self-protection of the energy store.

On the whole, a new type of luminaire concept is consequently provided, with which it is possible, as necessary, to grasp a luminaire which is provided in the region of a charging device and which is generally fully recharged, to separate said luminaire from the charging device, and then to carry it to any location at which lighting is desired. On the one hand this allows an unlimited flexibility with regard to providing lighting at a wide range of different locations. On the other hand a lighting plan can be designed from the outset such that power outlets for luminaires do not have to be provided everywhere. In addition, it can still be possible to provide lighting in spaces or at places where there are no power outlets provided.

In the case of the above-described electrical parameters of capacity for the energy store and energy consumption of the lamp arrangement, it is possible to provide sufficient lighting for a wide range of different activities for a number of hours without recharging. The lighting period at full light output lies preferably in a range of from half an hour to a week, in particular in a range of from two hours to ten hours. The energy store is preferably based on available secondary battery technologies, such as lithium-ion secondary batteries or the like. A portable luminaire can use for example one or more secondary batteries, as are also used in modern mobile telephones or the like. In a variant the energy store is fixedly integrated in the body of the luminaire. In an alternative preferred embodiment a compartment which is to be opened by a user is provided, within which compartment the energy store(s) is/are received, such that a user can exchange the energy store independently. The energy store can be an LiPO secondary battery for example, which is preferably provided with a protection circuit and housing. The compartment for receiving the energy store can preferably be provided on the underside of a foot of the luminaire.

By way of example, a USB socket or USB micro socket can be formed on the body of the luminaire and is connected to the energy store in order to recharge this. Alternatively or additionally, a charging station can be provided, which includes an adapter from USB or mini USB to a magnetic contact arrangement. Such a charging station can include, for example, a USB socket or a mini USB socket, into which a conventional USB cable or mini USB cable is inserted, for example on a charging device housing, which can form such a charging station. The magnetic contact can produce, for example, an independent connection to corresponding contacts on a foot of the luminaire when the charging station approaches the luminaire foot (or vice versa). The magnetic connection should be sufficiently strong here for the luminaire to be positioned without separation (within the cable length of the attached USB cable). To release the connection, the user can stand with his/her foot on the projecting end of the charging station in order to fix this on the floor whilst he/she releases the luminaire from the magnetic coupling.

The above object is also achieved by various types of luminaires which can be used for the above-described luminaire arrangement.

The object stated in the introduction is achieved in full overall.

It is generally conceivable to provide the interface arrangement between the energy store and the charging device as a conventional electrical plug connection.

However, it is particularly preferred when the charging device and the energy store can be coupled by means of an inductive interface arrangement such that the energy store can be charged inductively.

In this embodiment the charging device and energy store or luminaire can be coupled and decoupled without the need to establish or release mechanical plug connections.

By way of example, an inductive charging station can be formed as a flat module, which is arranged on a flooring surface. A flat inductive charging device of this type can also be integrated for example in a flooring surface, for example instead of a tile or the like, or can be arranged beneath a non-conductive flooring surface, such as a wood flooring surface or the like.

Here, it is particularly preferred when the inductive charging device has a coil which is flat and which is oriented, within a charging device housing, substantially parallel to a horizontal. Accordingly, a corresponding inductive charging coil can be arranged on the body of the luminaire, for example in the region of a foot or the like, which charging coil is preferably likewise oriented horizontally in a charging position of the luminaire.

In accordance with a further embodiment the interface arrangement alternatively or additionally includes an electrical connection arrangement, the connection arrangement being held magnetically in a connection position, such that a separation of the connection arrangement is facilitated.

In this embodiment the electrical connection between charging device and luminaire can be provided such that the electrical contact is made by magnetically attracting the interface elements of the charging device on the one hand and luminaire on the other hand. If the luminaire and the charging device are forcibly separated from one another, this occurs in a facilitated manner by overcoming the magnetic force of attraction. Damage in the region of the interface arrangement on account of such a forcible separation, as could occur for example in the case of mechanical plug connections, is avoided as a result.

In accordance with a further preferred embodiment the luminaire arrangement includes a plurality of portable luminaires, which each have a control arrangement, each control arrangement including a wireless communications device, the communications devices of at least two luminaires being able to communicate with one another such that the luminaires can be switched jointly.

In other words, in this embodiment a plurality of luminaires of this type can be switched synchronously with one another. The term "switch" is to include in the present case in particular a switching on and off, but can also include dimming.

Here, it can be advantageous if, with operation of just one of the luminaires, the other luminaires are then switched synchronously hereto. Alternatively, is also conceivable to switch a plurality of luminaires by means of a control arrangement, such as a remote control, a mobile telephone, a tablet computer, or the like. Here, it is conceivable for a connection to be established between a control arrangement of this type and one of the portable luminaires so as to then synchronously switch a plurality of luminaires.

The wireless communications device can be an infrared network or a radio network. The transmission standard can be, for example, an LAN standard, a Bluetooth standard, Zigbee, NFC, or the like.

When a luminaire has a body with a foot, on which luminaire contacts of an interface arrangement for charging an integrated energy store are provided, luminaire contacts of this type can be provided on one side in such a way that a connection axis of an electrical connection arrangement has a connection axis which is oriented parallel to a horizontal, in particular parallel to a supporting plane. The supporting plane can be a plane parallel to a floor in the case of a freestanding luminaire or a plane parallel to a wall in the case of a wall luminaire. The supporting plane is preferably a plane which is formed parallel to a base area of a foot of a freestanding luminaire.

It is particularly preferred when the body of the luminaire defines a supporting plane of this type and when the interface arrangement has an electrical connection arrangement with a connection axis which is oriented transversely to the supporting plane.

In the case of a foot of a freestanding luminaire, the connection axis consequently is not oriented horizontally, but transversely hereto, in particular perpendicularly hereto.

Here, the connection axis is preferably the axis along which contacts of the electrical connection arrangement of the charging device on the one hand and the body of the luminaire on the other hand are moved toward one another or are aligned with one another.

The embodiment of an electrical connection arrangement with a connection axis which is oriented transversely to the supporting plane makes it possible, when the luminaire contacts are formed on a foot of a freestanding luminaire, for the connection axis to extend perpendicularly. Here, the luminaire can be moved substantially transversely to the horizontal in order to release the electrical connection arrangement. This can be combined with an embodiment as described hereinafter in which a charging device has a housing which has, on its upper side, a foot placement surface and of which the charging interface is likewise formed on the upper side, so as to in this way provide a substantially perpendicular connection axis.

In accordance with a preferred embodiment the body here of the luminaire has a recess, in which at least a portion of a charging device housing can be inserted, the shape of the recess and the shape of the charging device housing being coordinated with one another such that the charging device housing can be pivoted relative to the body of the luminaire parallel to the supporting plane by an angle which lies in a range of from 10° to 90°.

The angle preferably lies in a range of from 15° to 45°, in particular from 20° to 35°.

Here, the pivot potential can be provided in particular about the above-mentioned connection axis.

This has advantages in particular with regard to the process of coupling the body of the luminaire to the charging device housing. Here, the charging device housing can rest on a flooring surface, for example. Due to the relatively large pivot angle, it is possible to move the body of the luminaire toward the charging device housing at different angular positions in order to perform the coupling process.

The recess on the body preferably has an insertion bevel which defines the above-mentioned angle.

In this embodiment it is also advantageous when the interface arrangement includes a magnetic holding device or coupling device, such that the electrical connection arrangement is electrically coupled substantially automatically as soon as the body approaches the charging device housing.

The recess is formed here preferably on an underside of a foot of the body of the luminaire in such a way that the luminaire can be brought not only from the side toward the charging device housing in order to carry out the coupling process. Rather, it is also possible to place the foot from above onto the charging device housing, the coupling process being implemented again preferably via magnetic coupling means, by means of which charging contacts on the charging arrangement housing and luminaire contacts on the body are electrically contacted with one another.

This magnetic connection is preferably sufficiently strong here, as mentioned above, for the luminaire to be positioned without separation, unless the user places a foot on the charging device housing or the user removes the luminaire, beyond the cable length of an attached cable, from a main plug to which the charging device is connected. In this case the magnetic coupling or magnetic connection is forcibly released, however this can be implemented without damaging the interface arrangement.

It may also be preferable if the recess has a recess cone, which is preferably oriented concentrically to the connection axis. In this case it is likewise preferred if a housing cone is provided on the charging device housing, which housing cone is likewise oriented concentrically to the connection axis. In other words, the cones of the recess on the one hand and charging device housing on the other hand are arranged concentrically to a particular electrical contact arrangement.

Consequently, it is preferred when the electrical connection arrangement has two concentric luminaire contacts on the body of the luminaire and two corresponding concentric charging contacts on the charging device housing.

The charging contacts are preferably provided on an upper side of the charging device housing. The luminaire contacts are also preferably provided on an upper side or ceiling of the recess, which is preferably open to the underside.

The present design also relates to a luminaire of a luminaire arrangement which is to be protected independently of the charging device. Here, the luminaire preferably has a handle, which is mounted and/or formed on the luminaire such that the luminaire, when grasped, assumes an equilibrium position which deviates from a normal operational position by no more than ±30°.

The handle is preferably shaped such that it can be grasped by hand. The term "grasped" in the present case is intended to mean that, for example, a finger is held centrally beneath the handle, such that the luminaire can freely come to a rest with respect to this suspended position. Compared with a normal operational position, in which the luminaire is placed for example on a floor, an equilibrium position is provided here which deviates from the normal operational position by no more than ±30°. Superior ergonomics and a high level of safety when carrying the luminaire can be achieved as a result.

As already mentioned, the handle is preferably a handgrip having a length in the range of from 5 cm to 20 cm and a diameter in the range of from 1 cm to 7 cm. In the case of a normal operational position of the luminaire, the handle extends preferably approximately in the horizontal direction, but can also be oriented perpendicularly hereto.

In any case a center of gravity of the handle is preferably oriented vertically with a center of gravity of the luminaire and/or a center of gravity of a foot of the luminaire, in such a way that the center of gravity of the handle in a vertical projection is distanced by no more than 10 cm, in particular by no more than 5 cm, from the center of gravity of the luminaire or the foot.

A further embodiment of such a luminaire, which is to be protected independently, includes a foot from which a pillar-like main body extends upwardly, a luminaire head being mounted on the main body, and a handle for carrying the luminaire being mounted on the main body.

In the case of this luminaire the pillar-like main body is preferably rigidly connected to the foot. The handle is preferably oriented horizontally and/or extends transversely to a longitudinal axis of the pillar-like main body. In particular, is preferred if a handle extends in the manner of a cantilever from the pillar-like main body, in such a way that the handle can be grasped for example from above in order to carry the luminaire.

It is particularly preferred if the main body has a longitudinal axis which is oriented at an angle in the range between 45° and 80° with respect to a horizontal.

Here, the main body is preferably connected to a foot in the region of a horizontal end of the foot and is inclined such that it extends over the foot. The handle preferably extends in a projection plane defined in this way and/or extends from the main body on a rear side of the main body averted from the foot. The handle is preferably arranged, in vertical projection, within a peripheral line of the foot.

In all embodiments in which the luminaire has a foot, the electrical energy store is preferably integrated therein. A recess is also preferably provided on the foot, as has been described above in a preferred embodiment, and serves to receive at least a portion of a charging device housing.

A further embodiment of such a luminaire, which is to be protected independently, has a control arrangement arranged on the body, said control arrangement having a switching arrangement which comprises a first switching device for switching the lamp arrangement and a second switching device, the first switching device preferably being contactless and/or dimmable, and/or the second switching device preferably being connected in series with the first switching device and/or being capacitive.

The lamp arrangement can preferably be switched in this embodiment via two control devices. The second control device is preferably closed during operation. By way of example, the second switching device can be closed when the luminaire is decoupled from a charging device.

The second switching device is preferably connected in series with the first switching device, the first switching device preferably being able to be switched and/or dimmed contactlessly. For this purpose, a contactless sensor such as a reflex light barrier is used, which for example can receive light reflected back from an operating member (for example a finger). The contactless sensor is preferably a contactless IR sensor, which for example can receive reflected-back IR light.

A reflex light barrier of this type is supplied here continuously with power during operation in order to emit a light beam and detect any reflections hereof. Although the consumption is very low, it is still preferred in the case of a portable luminaire separable from a charging device if this type of power consumption is not permanent. Consequently, it is preferred when the second switching device, which is preferably connected in series with the first switching device, opens once a predetermined period of time has elapsed, for example after a period of time ranging from one minute to ten minutes. A renewed closing of the second switching device is then only possible for example via a mechanical switch which operates the second switching device. However, it is particularly preferred when the second switching device is capacitive, in such a way that a housing or body of the luminaire for example must be contacted in order to close the second switching device again following a sleep mode of this type and in order to consequently wake the luminaire from the sleep mode. The first switching device can then be activated again, a light beam of a reflex light barrier being emitted.

A capacitive design of the second switching device generally means that a body of the luminaire is electrically conductive at least in a region to be contacted, or that an electrically conductive capacitive sensor portion is formed behind a housing portion, similarly to a hob that is to be capacitively operated.

In accordance with a further embodiment of such a luminaire, which is to be protected independently, the lamp arrangement and the energy store are fixed to the body, the body being provided with holding or supporting means in order to temporarily hold or support the body at the location to be lit.

The holding means can be mechanical holding or supporting means, for example a hook for hanging the luminaire. However, in the simplest case, the holding means could also be a foot by means of which the luminaire can be set down on a floor.

It is particularly preferred when the holding means are formed as magnetic holding means. In this case it is possible for example to hold the luminaire magnetically at a location to be lit. The magnetic holding means can consist of the fact that the luminaire has a ferromagnetic portion which can be magnetized. Alternatively, the luminaire can have a magnet by means of which the luminaire can be temporarily fixed to another magnet or to a ferromagnetic material.

By way of example, a magnetic counter piece can be secured to a wall in order to secure a luminaire to a wall in a simple manner, even if there is no main outlet provided there.

A fastening to a ceiling is also possible via such magnetic holding means.

The magnetic holding means can be standardized for different luminaires. In particular, it is possible to provide a holding magnet arrangement on the body, which arrangement has a centering feature, such as a circular protrusion. The magnetic holding means can also comprise a counter piece having a centering recess, which is substantially circular. Here, the counter piece can be secured for example to a wall, but can also be secured to a ceiling or to an end of a suspension. The counter piece is preferably produced at least in part from a ferromagnetic material, such that the counter piece can be produced comparatively economically.

In an alternative embodiment the counter piece can include a magnet, with corresponding ferromagnetic portions of the magnetic holding means being provided on the body of the luminaire. Luminaires having magnetic holding means of this type preferably do not have a magnetic charging interface, and vice versa.

As described above, a luminaire according to the present design can be formed as a freestanding luminaire, as a wall luminaire, or as a hanging or pendant luminaire. A design as a ceiling luminaire is also possible.

In a particularly preferred variant the luminaire can have a body which has a foot and a head connected thereto via a rotational joint. The lamp arrangement can be formed on the head. The lamp arrangement can be connected via a cable in the rotational joint to an energy store in the foot. By way of example, the energy store can be a lithium-ion secondary battery, as is also used in mobile radio devices. An on/off switch can be integrated in the foot, in particular on the underside thereof. It is also preferred if magnetic holding means, in particular one or more magnets, are integrated in the foot. In this case, it is preferred when an underside of the foot is produced from a plastics material. It is particularly preferred if the foot has an upper shell and a lower shell, the upper shell preferably being produced from metal, in particular an aluminum alloy, and the lower shell preferably being produced from plastic. In this case the effect of the magnets is improved if a luminaire of this type is secured to a magnetic counter means, for example to a ferromagnetic portion, such as a refrigerator door, a metal plate, a vehicle body, etc.

In the variant in which a foot and a body are connected via a rotational joint, a charging interface in the form of a standard interface or computer interface can be formed, such as a USB interface. A luminaire of this type is particularly portable and can be charged at any location. The same is also true for luminaires which are formed for example as wall luminaires, as ceiling luminaires, or as pendent luminaires.

In accordance with a further embodiment of a luminaire, which is to be protected independently, the luminaire includes a body to which the lamp arrangement and the energy store are fixed and which defines a supporting plane, which for example can be a resting plane of a foot, the interface arrangement comprising an electrical connection arrangement having a connection axis formed transversely to the supporting plane.

As explained above, a luminaire of this type is preferably formed as a freestanding luminaire, in which the luminaire contacts of the electrical connection arrangement are formed in a recess in the foot, which is open on a side of the foot and on an underside of the foot, as described above.

A further embodiment of a luminaire, which is to be protected independently, includes a body which defines a body plane and in which a rechargeable electrical energy store is received, the luminaire also including a lamp arrangement which has a light input portion and a luminous panel with a side edge, into which light from the light input portion is coupled, the luminous panel being oriented at an angle of greater than 3° and less than/equal to 90° to the body plane.

In this embodiment the light input portion can be formed for example by a light strip having a plurality of adjacently arranged LEDs, the light strip being arranged in the region of an interface between the body and the luminous panel.

A luminaire of this type is suitable for example as a wall or ceiling luminaire, the body then preferably being mounted parallel to the wall or ceiling, and the body plane thus simultaneously forming a supporting plane of the above-described type.

In this case the luminous panel protrudes relative to the wall or ceiling and consequently can be used advantageously for lighting.

The luminous panel is preferably opaque or has scattering elements, such that light is coupled out from at least one surface of the luminous panel, said surface being oriented perpendicularly to the side edge, in particular from two opposite surfaces. On account of the angled embodiment of the luminous panel, light can be irradiated both directly, for example downwardly, and indirectly upwardly.

A luminaire of this type is also suitable as a pendant luminaire.

Magnetic holding means are preferably also formed on the body in order to secure the body temporarily to a wall, to a ceiling or also to a pendant.

An interface for charging the energy store is preferably provided on the body. The interface is preferably a standard interface, in particular in the form of a standardized computer interface, such as a USB interface.

The present design also relates to a charging device for a luminaire arrangement of the type disclosed herein and/or for a luminaire of the type disclosed herein, the charging device having a flat charging device housing, which has an underside, which can be placed on a floor, an upper side, and a side face connecting the underside and the upper side, a holding surface, for example in the form of a foot placement surface, being formed on the upper side, and/or a charging interface for connection to a rechargeable energy store being arranged on the upper side and/or on the side face.

In this embodiment the housing can be fixed by way of example by means of a foot or a hand, and the luminaire can then be separated from the interface at the side face of the charging device housing. Here, is particularly preferred when the coupling between charging device and luminaire has magnetic means, which facilitates a separation of the interface or the connection.

The flat housing of the charging device can include here charging electronics, such that the housing is connected to a main plug. Here, by way of example, the charging electronics can convert a main voltage of 220 volts into a suitable charging voltage or a charging current in the form of a direct current.

In a particularly preferred variant, however, charging electronics are provided in a separate housing, which for example can be part of a charging plug which can be plugged into a power outlet. A cable connected to a charging plug of this type, via which cable the charging DC voltage or the charging direct current is already provided, can then be a USB cable or a mini USB cable for example, as is known in the case of smart phones and other devices of this type. The flat housing of the charging device can in this case include a passive adapter which connects a USB connector or a mini USB connector to suitable contacts, which for example cooperate with a magnetic coupling between the housing and the luminaire. In this case, the flat housing preferably does not contain any active electronics, but is formed in the manner of a charging station or a magnet dock and preferably includes merely a socket for the connector of a cable providing a DC voltage, such as a USB cable, and contact means for making electrical contact with the luminaire so as to thus supply power for charging to the energy store in the luminaire.

Consequently, it is preferred when the charging device is equipped such that a standard interface is formed on the charging device housing, via which standard interface an electrical charging DC voltage can be provided, the electrical standard interface in the charging device housing being electrically connected to charging contacts on the outer side of the charging device housing, in particular on the upper side thereof, the charging contacts being electrically connectable to luminaire contacts on a body of a luminaire.

For charging, a conventional USB charging device can be used alternatively, for which purpose a USB mini socket or USB micro socket is preferably provided on the body of the luminaire.

As explained above, a charging device housing in the form of a dock is preferably provided when the luminaire is a freestanding luminaire. In all other cases, it is generally preferred when a standard interface, such as a USB socket, is provided on the body.

In accordance with a further preferred embodiment, which is to be protected independently, a charging device includes a charging station, to which a plurality of luminaires can be fixed temporarily and which has a plurality of interfaces, corresponding to the plurality of luminaires, for simultaneously charging the luminaires fixed to the charging station.

The basic concept of a charging device of this type having a charging station consequently lies in the fact that a plurality of luminaires can be charged simultaneously. Here, the charging station preferably has a plurality of luminaire mounts, which are preferably each identical so as to be able to receive identical types of luminaires. Alternatively, however, different luminaire mounts for receiving different types of luminaires can also be provided on the charging station.

The charging station preferably has a base by means of which the charging station can be placed on a horizontal surface. The charging station also includes a power supply interface, via which charging power can be fed. It is indeed conceivable for a converter for converting a main voltage into a charging DC voltage to be contained in the charging station itself, for example in a base hereof. However, a charging interface which is connected by means of wiring provided in the charging station to the plurality of interfaces for simultaneous charging of a plurality of luminaires is preferably provided on a housing of the charging station, preferably on the base.

In this case, the central charging interface at the charging station can be either a standard interface, such as a USB port. Alternatively, a recess can be provided on the charging station, into which recess at least a portion of a charging device housing can be inserted, the merits of which have been described above in similar form for the foot of a particular embodiment of a luminaire according to the present design.

A charging device housing of this type can be identical to that described above, specifically with concentric charging contacts which can be electrically connected to concentric "luminaire" contacts on the charging station. The charging device housing can again be formed such that, on an upper side hereof, a foot placement surface or hand resting surface or the like is formed, such that the charging device housing can be fixedly held by the part protruding from the recess of the charging station in order to separate a magnetic coupling between the charging device housing and the charging station.

The charging device housing can also have a standard interface in the form of a USB interface or the like, via which the charging device housing can be connected to a standard charging converter. In this case the charging device housing does not have its own converter provided therein, but instead merely electrical wiring between the standard interface and charging contacts.

The charging device housing can consequently be used to recharge a luminaire which has a foot on the underside of which a recess is provided for receiving a portion of the charging device housing. However, the charging device housing can also be used to charge a plurality of luminaires which are temporarily fixed in a charging station of the above-described type. The charging station is preferably formed such that it has a base, on which at least two, preferably four or more luminaire mounts for a corresponding number of luminaires are provided. The luminaires are preferably luminaires in which a luminous panel extends at an angle from a body. The luminaire mounts can be provided here in order to receive the corresponding bodies of these luminaires. The mounts are preferably arranged here such that in each case two luminaires can be received directly adjacently via their bodies, in such a way that their luminous panels extend in opposite directions.

It goes without saying that the above-mentioned features and the features yet to be explained hereinafter can be used not only in the specified combinations, but also in other combinations or in isolation without departing from the scope of the present invention.

DRAWINGS

Exemplary embodiments of the invention are illustrated in the drawing and will be explained in greater detail in the following description. In the drawing:

FIG. 6 shows a schematic illustration of a further embodiment of a luminaire arrangement;

FIG. 7 shows a plan view of a charging device of the luminaire arrangement of FIG. 6;

FIG. 8 shows a schematic illustration of a control arrangement of a luminaire;

FIG. 11 shows a schematic illustration of an interface arrangement with vertical connection axis for an embodiment of a luminaire arrangement, more specifically obliquely from above;

FIG. 12 shows an illustration comparable to FIG. 11 obliquely from below;

FIG. 13 shows an illustration of the interface arrangement from below prior to a coupling of charging device housing and body;

FIG. 14 shows an illustration comparable to FIG. 13 once the coupling has been established;

FIG. 15 shows a schematic perspective view of a charging device housing in accordance with a further embodiment;

FIG. 16 shows the charging device housing of FIG. 15 from above;

FIG. 17 shows a perspective illustration of a further embodiment of a luminaire obliquely from the front;

FIG. 18 shows a perspective illustration of the luminaire of FIG. 17 obliquely from behind;

FIG. 19 shows an operating device for luminaires;

FIG. 20 shows a perspective view of a further embodiment of a luminaire in the form of a pendant luminaire;

FIG. 21 shows a schematic illustration of a magnetic securing part for magnetic holding means from the front;

FIG. 22 shows the magnetic securing part of FIG. 21 in a sectional view;

FIG. 23 shows a schematic illustration of a luminous panel and of a light input for the luminaires shown in FIGS. 17, 18 and 20;

FIG. 24 shows a luminaire arrangement having a plurality of luminaires and a central operating device;

DESCRIPTION

Figure 1:
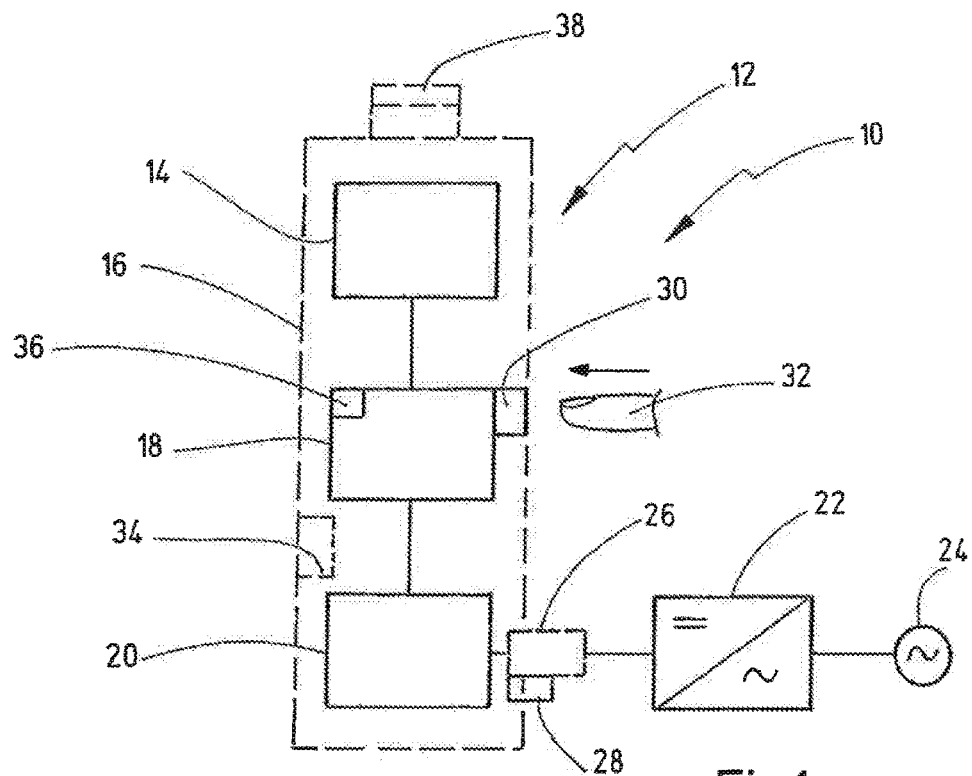
FIG. 1 shows a schematic illustration of a luminaire arrangement according to the present design.

FIG. 1 schematically illustrates a luminaire arrangement designated generally by 10. The luminaire arrangement 10 includes a luminaire 12. The luminaire 12 comprises a lamp arrangement 14, which is incandescent lamp-based or halogen-based, but in particular is formed as an LED lamp arrangement, in particular in the form of an array formed from a plurality of individual LEDs.

The luminaire 12 also has a body 16, which can be formed in one or more parts. The body 16 can be a housing, can be an arrangement formed from a foot, pillar and head, but can also be a light-permeable, opaque or otherwise scattering surface. In some cases the body can be a closed sleeve formed from a light-permeable or light-scattering material. In other variants the body can be a housing not permeable to light, which for example includes a slot or another opening for the exit of light of the lamp arrangement 14. In many cases the lamp arrangement 14 can include a flat element formed from a light-scattering plastics material which is provided with holes, for example with countersunk points for each LED of an LED array. The rear side of a plastic or glass arrangement of this type can be covered by a housing which covers the rear side of the LED array arrangement and, where applicable, control electronics assigned to this arrangement.

Examples of luminaires of this type can be found on the webpage www.nimbus-lighting.com, with reference being made to the full content thereof.

The luminaire 12 also includes a control arrangement 18, which is designed to control the lamp arrangement 14. The luminaire 12 also has an electrical energy store 20, which is fixedly connected to the body 16, in particular is received in a housing portion of the body. It is particularly preferred when the electrical energy store 20, which for example can be formed as a secondary battery and consequently can be recharged, is received in a foot of the luminaire 12.

The luminaire arrangement 10 also has a charging device 22, which converts energy from a power source 24, for example a main power supply 24, into a suitable DC voltage for charging the electrical energy store 20 and/or for supplying power to the lamp arrangement 14.

An interface arrangement 26 serves to connect the charging device 22 to the luminaire 12. The interface arrangement 26 can include an electrical connection device, for example a mechanical plug connector device. However, the interface arrangement 26 can also be an inductive interface arrangement. The interface arrangement 26 can also be assigned a magnet arrangement 28, which serves to electrically contact the interface elements of the luminaire 12 and the charging device 22 with one another on the basis of magnetic attraction, such that a release of the interface arrangement 26 or separation of the interface arrangement 26 can be facilitated.

The control arrangement 18 has a circuit arrangement 30, which preferably can be operated by means of an operating object 32, such as a finger. The switching arrangement 30 can be a mechanical switching device, but can also be a capacitive switching device, a contactless switching device with reflex light barrier, or the like. The switching arrangement 30 can be integrated for example in a head of the body 16 of the luminaire 12.

The luminaire 12 also includes a supporting or holding portion 34, by means of which the luminaire 12 can be supported or held at a location to be lit. In the simplest case, the supporting or holding portion 34 can be a foot, by means of which the luminaire 12 is placed on a floor. The supporting/holding portion 34, however, can also be a magnetic portion, a hook, or the like.

In some embodiments the control arrangement 18 includes a communications device 36, by means of which the luminaire 12 can be connected for communication to another luminaire 12 in order to switch the luminaires in a synchronized manner. However, the communications device 36 can also be designed to be connected to an operating device, for example a remote control, a mobile telephone, a tablet computer, etc. The communications device 36 is preferably a wireless communications device, based for example on one of the following standards: WLAN, Bluetooth, Zigbee, NFC, etc.

Lastly, the luminaire 12 can include a handle 38, by means of which the luminaire 12 can be carried, more specifically to a location to be lit, the luminaire 12 for this purpose being separated from the charging device 22, preferably beforehand, in such a way that the luminaire arrangement 14 is supplied with power exclusively from the electrical energy store 20.

Figure 2:
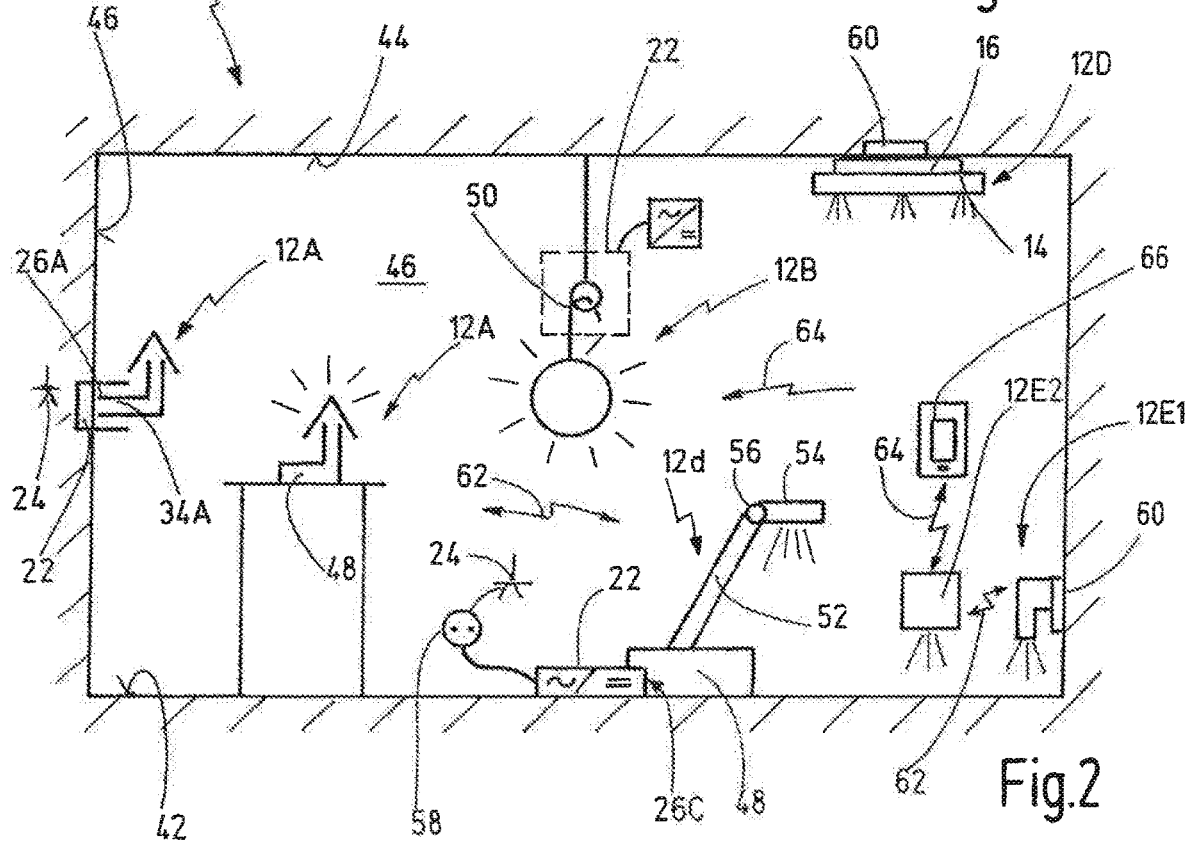
FIG. 2 shows schematic illustrations of further luminaire arrangements in a building.

FIG. 2 illustrates different types of luminaires or luminaire arrangements, more specifically with respect to a building 40, which includes a floor 42, a ceiling 44 and at least one vertical wall 46.

FIG. 2 thus shows a wall luminaire 12A having a supporting/holding portion 34A, by means of which the luminaire 12A can be connected to an interface arrangement 26A in a region of the wall 46, a charging device 22 which is connected to a power source 24, such as a main power supply, being integratable in the wall. In this case the wall luminaire 12A can be grasped for example at a vertically extending part of a body and can be separated from the interface arrangement 30 so as to then be placed on a table, for example by means of a foot 48, so as to be able to carry out a lighting function in the region of the table independently of the main power supply.

An alternative embodiment of a luminaire 12B for example has a light-permeable or light-scattering body and also a hook 50, which forms a supporting or holding portion and for example is connectable to a hook eyelet, which hangs from a ceiling 44. With a hook 50 of this type, the luminaire 12B, which in this case is formed as a ceiling luminaire, can also be hung at other locations, for example also in the garden, on a terrace, or the like. Here, a charging device 22 can likewise be provided in the region of the hook eyelet, by means of which charging device an energy store contained in the luminaire 12B can be charged.

A further luminaire in the form of a freestanding luminaire is shown at 12C. The freestanding luminaire 12C has a foot 48, from which a rod-shaped or pillar-shaped main body 52 protrudes upwardly. The main body 52 can be oriented at an incline to a horizontal, as is illustrated schematically in FIG. 2. A head 54 can be supported at a free end of the main body 52, more specifically for example via a joint 56, which can be formed as a single joint or as a multiple joint. A lamp arrangement 14 in this case be integrated in the head 54, as is illustrated schematically in FIG. 2.

It can be seen that an interface arrangement 26C is formed in the region of the foot in order to connect the luminaire 12C to a charging device 22, which for example has a flat housing and is set down on the floor 42. The charging device 22 can be connected via a cable (not illustrated in greater detail) to a power outlet 58 of a power source 24.

A ceiling luminaire is shown at 12D which includes a flat lamp arrangement 14, on the rear side of which a body 16 is formed. The body 16 can cooperate in this case with a magnet 60, which is secured to the ceiling 44. Consequently, following a charging process at a charging station (not illustrated), the ceiling luminaire 12D can be secured upwardly to the ceiling 44, more specifically by means of the magnet 60, which in this case serves as a supporting or holding portion.

A similar concept is shown for a floor-lighting luminaire 12E1, which can be secured by means of a magnet 60 in a region of a wall 46 close to the floor 42 by means of a magnet 60.

In FIG. 2 a further luminaire 12E2, in addition to the luminaire 12E1, is illustrated on a further wall, the luminaires 12E1 and 12E2 preferably being of identical construction. The luminaires 12E1, 12E2 can each serve to light a floor, for example in the region of stairs or the like. In a preferred variant the luminaires 12E1, 12E2 can communicate wirelessly with one another via communications devices (not presented in greater detail), as is shown schematically in FIG. 2 at 62. The luminaires 12E1, 12E2 can each be switched, for example switched on and off or dimmed, synchronously as a result.

An operating device is shown at 66 which can be formed as a remote control, as a mobile telephone, as a tablet computer, etc. Communication between the operating device 66 and at least one of the luminaires 12E1, 12E2 is illustrated at 64. The operating device 66 can also be formed, however, so as to control all luminaires 12E1, 12E2 in parallel and to switch these in parallel.

The concept of the communication between luminaires is also conceivable for other of the above-described luminaire types, as is shown schematically for example at 62 between the luminaires 12A and 12C. The operating device 66 is also designed, as appropriate, to also switch other luminaires, for example the luminaire 12B, as is also indicated in FIG. 2 by an arrow 64.

Figure 3:
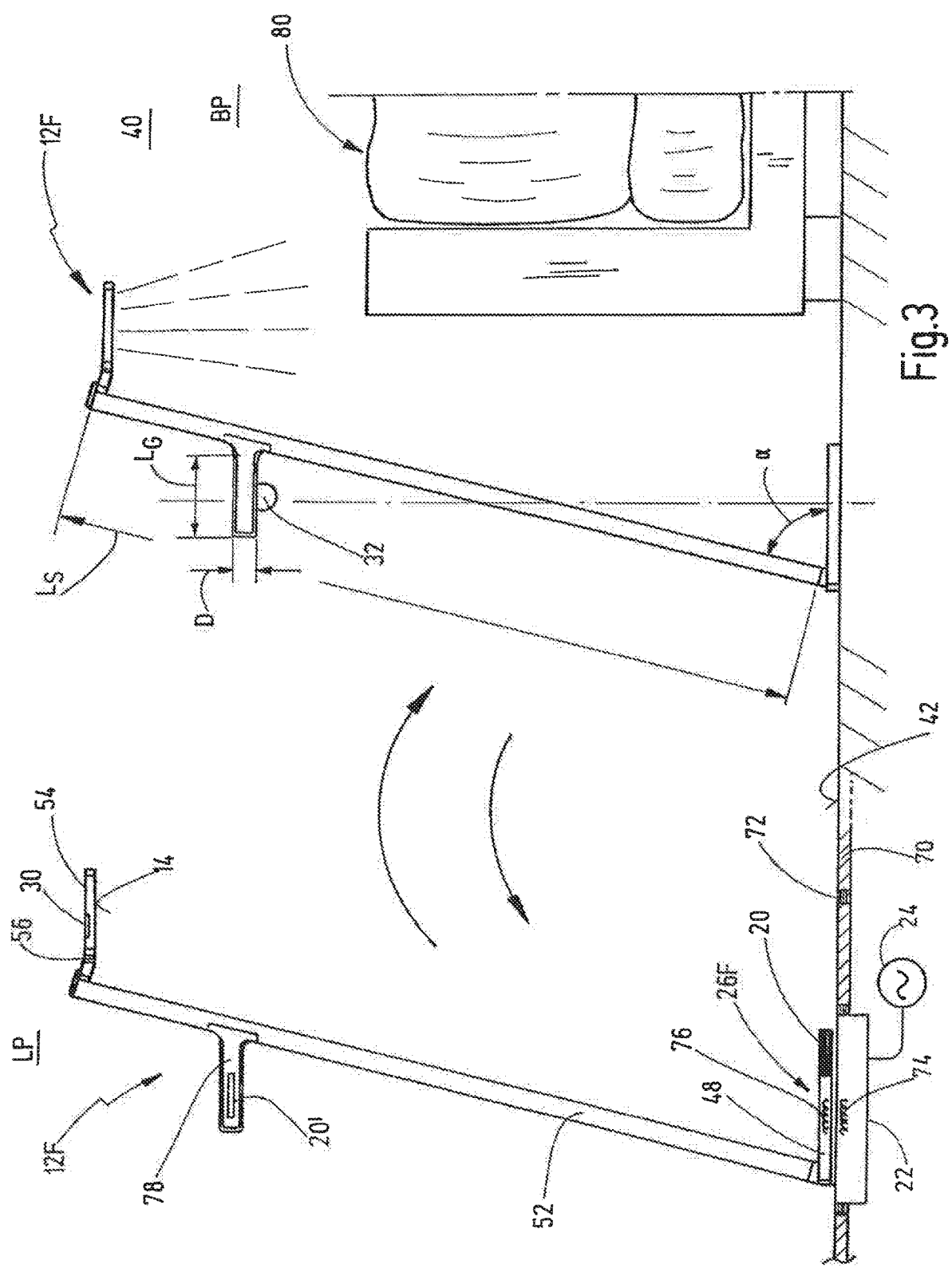
FIG. 3 shows a further embodiment of a luminaire arrangement according to the present design in a charging position and in a lighting position.

FIG. 3 shows a further embodiment of a luminaire 12F which corresponds in terms of structure and operating principle to the luminaire 12C of FIG. 2. Like elements are therefore characterized by like reference signs.

The luminaire 12F includes a body having a pillar-like main body 52, at the end of which a head 54 is supported via a joint 56. The joint 56 can be a joint movable about three axes. A switching arrangement 30 is provided on an upper side of the head 54, by means of which switching arrangement a lamp arrangement 14 arranged on the underside of the head 54 can be switched.

The foot 48 is formed such that it accommodates the energy store 20. An inductive charging process can also take place between the foot 48 and a charging device 22 integrated in the floor 42. For this purpose, the charging device 22, in the case of a tiled floor, can be integrated in the floor instead of a tile 70, for example. Joins of tiles 70 of this type are illustrated schematically at 72. In other words, an upper side of the charging device 22 can be flush with the floor 42 so that the luminaire 12F can be placed onto the charging device 22 in order to carry out an inductive charging process. For this purpose, the charging device 22 includes a schematically illustrated coil 74, and a further coil 76 is integrated in the foot 48. The coils 74, 76 cooperate magnetically during the inductive charging process, the merits of which are known per se. It goes without saying that a further part of the control arrangement 18 can preferably also be integrated in the foot 48 in order to conduct energy received via the interface arrangement 26F to the energy store 20 and/or to the lamp arrangement 14.

As it is also illustrated in FIG. 3 on the left-hand side, the luminaire 12F has a handle 78. The handle 78 extends in a cantilever-type manner from the pillar-like main body 52. The main body 52 is rigidly connected to foot 48 at a lateral end thereof and extends at an angle α to the horizontal, more specifically such that the main body 52 extends in a vertical projection transversely above the foot 48. The angle α can lie in a range of from 45° to 80°, in particular in a range of from 60° to 80°. The handle 78 is fixed to the main body 52 preferably on a side averted from the foot 48. The handle 78, as is illustrated in FIG. 3, has a length $L_G$ and a diameter D. The length $L_G$ can lie for example in the range of from 5 cm to 20 cm. The diameter D can lie for example in the range of from 1 cm to 7 cm.

The handle 78 can be grasped easily from above in order to carry the luminaire. The handle 78 can be fixed in a region of an upper half of the main body 52 and can extend substantially in the horizontal direction.

An axial center of the handle 78 is preferably arranged above a center of gravity of the luminaire 12F or of the foot 48, as is illustrated by a vertical dashed line in FIG. 3. If the handle is consequently grasped from below by means of an operating member, such as a finger 32, the luminaire 12F assumes an equilibrium position, which deviates from the normal operational position shown on the left in FIG. 3 by no more than ±30°, preferably by no more than ±15°.

FIG. 3 also shows that the luminaire can be removed from the location LP of the charging device 22 by means of the handle 78, more specifically to a location to be lit BP, which is schematically indicated in FIG. 3 by a sofa 80, such that the luminaire 12F can serve as a reading luminaire. An axial length $L_S$ of the main body 52 can lie for example in the range of from 35 cm to 150 cm.

Although in FIG. 3 an inductive charging device 22 is shown, it goes without saying that the luminaire 12F can also be formed such that an electrical interface device is formed on a side of the foot 48, similarly to that illustrated at 26C in FIG. 2.

Figure 4:
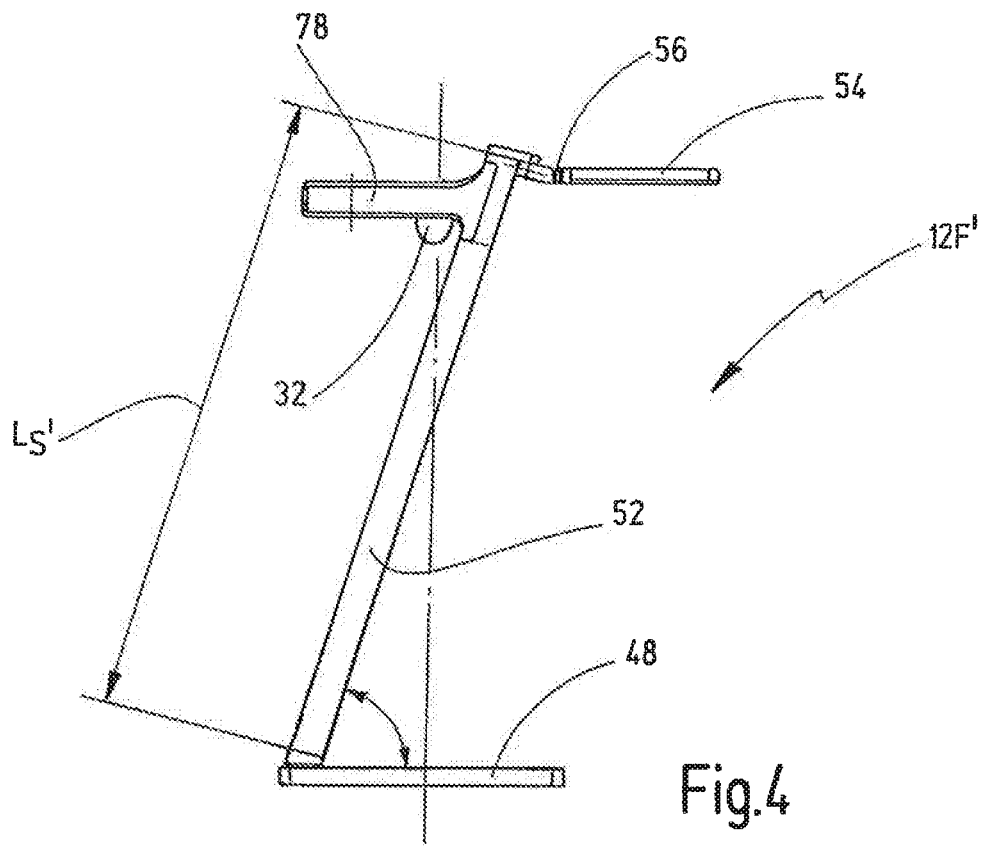
FIG. 4 shows an illustration comparable to FIG. 3 of a further embodiment of a luminaire.

FIG. 4 shows a further luminaire 12F', which illustrates a modification of the luminaire shown in FIG. 3. The luminaire 12F' corresponds generally in terms of structure and operating principle to the luminaire 12F of FIG. 3, and therefore like elements are provided with like reference signs.

The luminaire 12F' has a main body 52 with a shorter length $L_{S'}$ than the luminaire 12F. The length $L_{S'}$ can lie for example in a range of from 15 cm to 50 cm. In this case, the handle 78 can be arranged in the region of the free end of the main body 52 averted from the foot 48. In this case, a position of the handle 78 lying above the center of gravity can lie closer to the main body 52 for example, as is schematically illustrated in FIG. 4.

Figure 5:
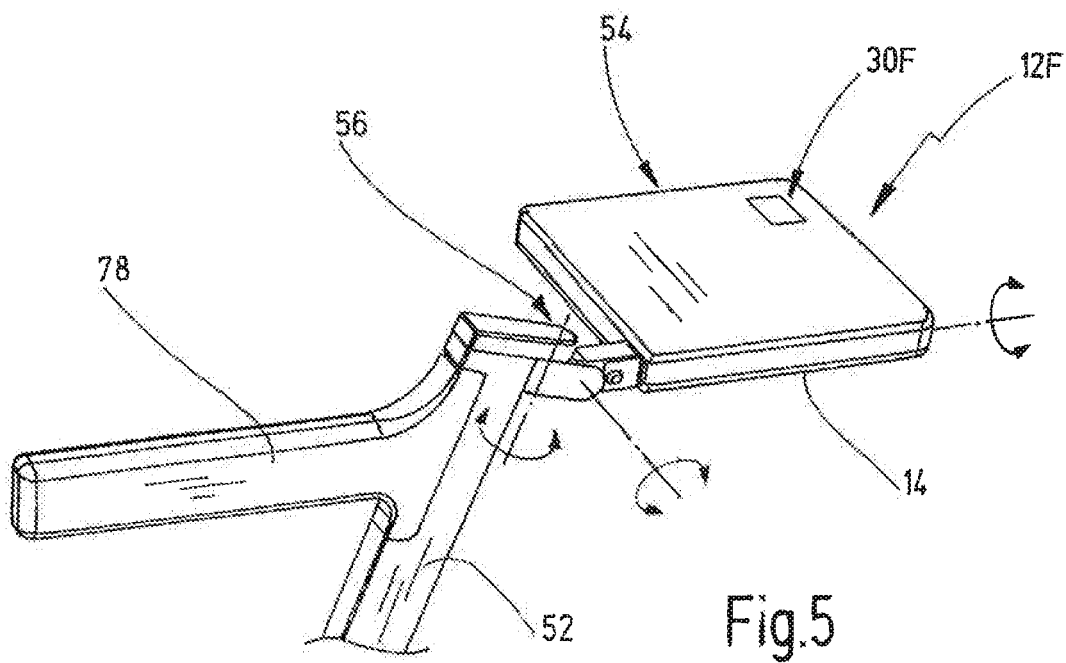
FIG. 5 shows a detailed view of the luminaire of FIG. 4.

FIG. 5 shows the luminaire 12F shown in FIG. 3 in the region of its head 14. It can be seen that the head 54 is rectangular in plan view and has a greater extension over both side lengths than over height. The lamp arrangement 14 is provided on the underside of the head 54. A switching arrangement 30F can be formed on the upper side of the head 54, which for example works contactlessly in the manner of a gesture control, the switching arrangement 30F possibly including a reflex light barrier.

It can also be seen in FIG. 5 that the joint 56 is rotatable about three axes which are independent of one another, such that a practically arbitrary adjustment of the head 54 with respect to the main body 52 is possible.

FIG. 6 shows a further variant of a luminaire 12F in combination with a charging device 22. The charging device 22 and the luminaire can be connected to one another via an electrical connection arrangement 82. The charging device 22 has a housing 83, which is formed as a flat housing and on which a plug 84 with charging contacts of the electrical connection arrangement 82 is provided. Accordingly, an electrical socket 86 with luminaire contacts is provided on the foot 48 of the luminaire 12F, in which socket the plug 84 can be inserted in order to couple the luminaire 12F to the charging device 22.

It can be seen that the foot 48 and/or the housing 83 can have a magnet arrangement 28 in order to hold the electrical connection arrangement 82 in electrical contact substantially on the basis of magnetic forces. In this way, the electrical connection arrangement 82 can be easily released, more specifically against the magnetic force of attraction of the magnet arrangement 28.

The housing 83 has an upper side 88 and an underside 90. The underside 90 can be set down on the floor 42. The plug 84 is formed in the region of a side face 92 connecting the upper side 88 and the underside 90.

When the luminaire 12F is brought into the vicinity of the charging device 22, a magnetic force of attraction 94 causes the electrical connection arrangement 82 comprising the plug 84 and the socket 86 to be closed. The plug 84 and the socket 86 are illustrated in an exaggerated manner in FIG. 6. In both cases the elements may also be much shorter, such that separation at an angle does not cause any mechanical damage either.

The upper side 88 of the housing 83 is formed as a foot placement surface. Consequently, a foot 96 can be placed thereon in order to fix the position of the charging device 22 by means of a vertical fixing force 98. The luminaire 12F can thus be released from the charging device 22 in a simple manner against the force of attraction 94 of the magnet arrangement 28 and can be brought to a location to be lit.

FIG. 7 shows the charging device 22 from above, with the upper side 88 of the housing 83 and one or more plugs 84 on a side face 92.

FIG. 8 shows a control arrangement 18 of a luminaire 12 in a schematic exemplary form. The control arrangement 18 includes a switching arrangement 30, which can be provided on a body 16, for example in the region of a head 54.

The switching arrangement 30 includes a first switching device 102. The first switching device 102 includes a contactless sensor 104, which comprises an emitter 106 for light and a receiver 108, the contactless sensor 104 possibly being formed as a reflex light barrier. The emitter 106 and the receiver 108 can be formed in a wall region of the body 16 or the head 54 such that the first switching device 102 can be actuated by the approach of an operating member, such as a finger 32.

The first switching device 102 can be connected here to a dimming device 110, which connects the energy store 20 to the lamp arrangement 14.

The switching arrangement 30 also includes a second switching device 112. The second switching device 112 comprises a contact sensor 114, which for example can be formed as a capacitive sensor and can be triggered by contact with an operating member 32, such as a finger. The second switching device 112 also includes a sleep control unit 116, which is connected to the contact sensor 114. The sleep control unit 116 is also connected to a time-delay member 118, which is connected to the first switching device 102. The sleep control unit 116 serves to actuate a switch 120 of the second switching device 112, which is connected in series with the first switching device 102.

Since the first switching device 102 consumes power during operation on account of the emitter 106, the switch 120 is opened via the time-delay member 118 a certain period of time after the last detection of a switching operation, so as to set the luminaire or the control arrangement 18 to a sleep mode. When contact is detected at the contact sensor 114, the sleep control unit 116 is initiated so as to cancel the sleep mode by closing the switch 120. The lamp arrangement now lights up again, and the contactless sensor 104 is supplied with power again, such that the luminaire can be dimmed again.

The time-delay member 118 can be set up to switch off the luminaire in an automated manner after a predetermined time.

In an embodiment illustrated in a dashed manner in FIG. 8 the sleep control unit 116 can also be designed to open or close a switch 122, which supplies power to the contactless sensor 104. By way of example, the switch 112 can be opened after the last actuation of the contactless sensor 104 after a predetermined period of time of, for example, one minute (preferred range 30 seconds to 5 minutes), such that power is no longer supplied to the contactless sensor 104. The switch 120 can remain closed in this variant, such that power continues to be supplied to the lamp arrangement 14, more specifically at the output level set by the dimming device 110.

When an operator wishes to then switch off the luminaire or change the output, he/she must first cancel the sleep mode via the contact sensor 114, whereby the switch 122 is closed, such that a contactless dimming of the lamp arrangement is possible again, and/or the lamp arrangement can be switched off.

The two variants can also be combined with one another such that the sleep control unit 116 can be used both for long-term switch-off of the lamp arrangement 14 and for short-term deactivation of the contactless sensor 104.

Figure 9:
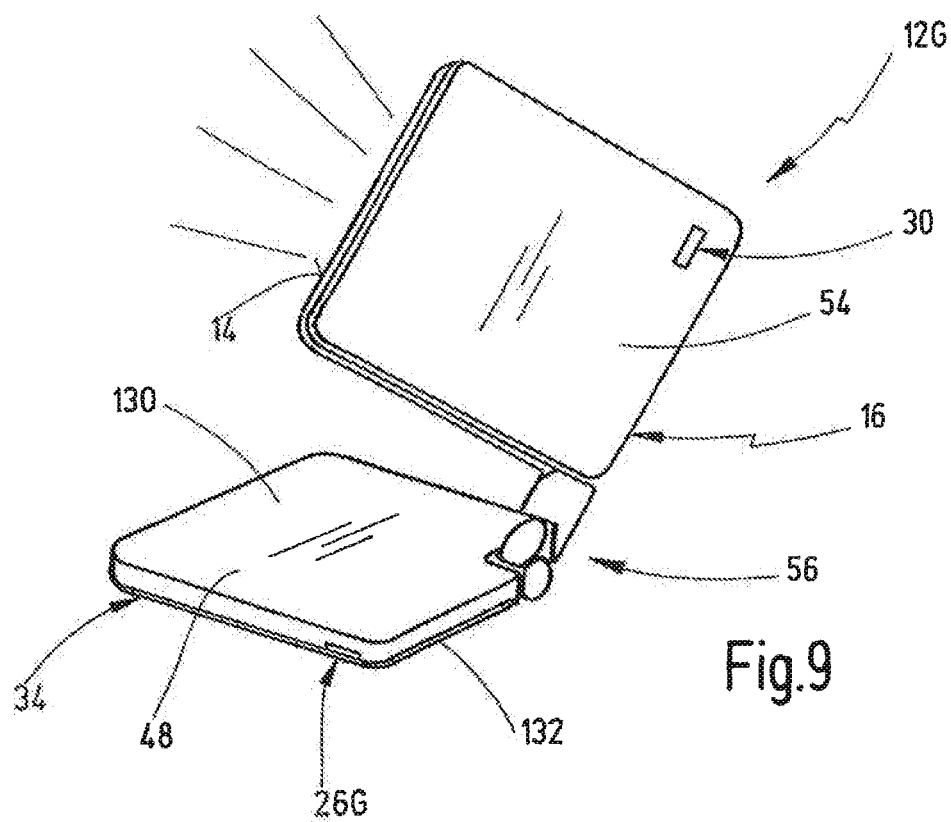
FIG. 9 shows a perspective illustration of a further embodiment of a luminaire.
Figure 10:
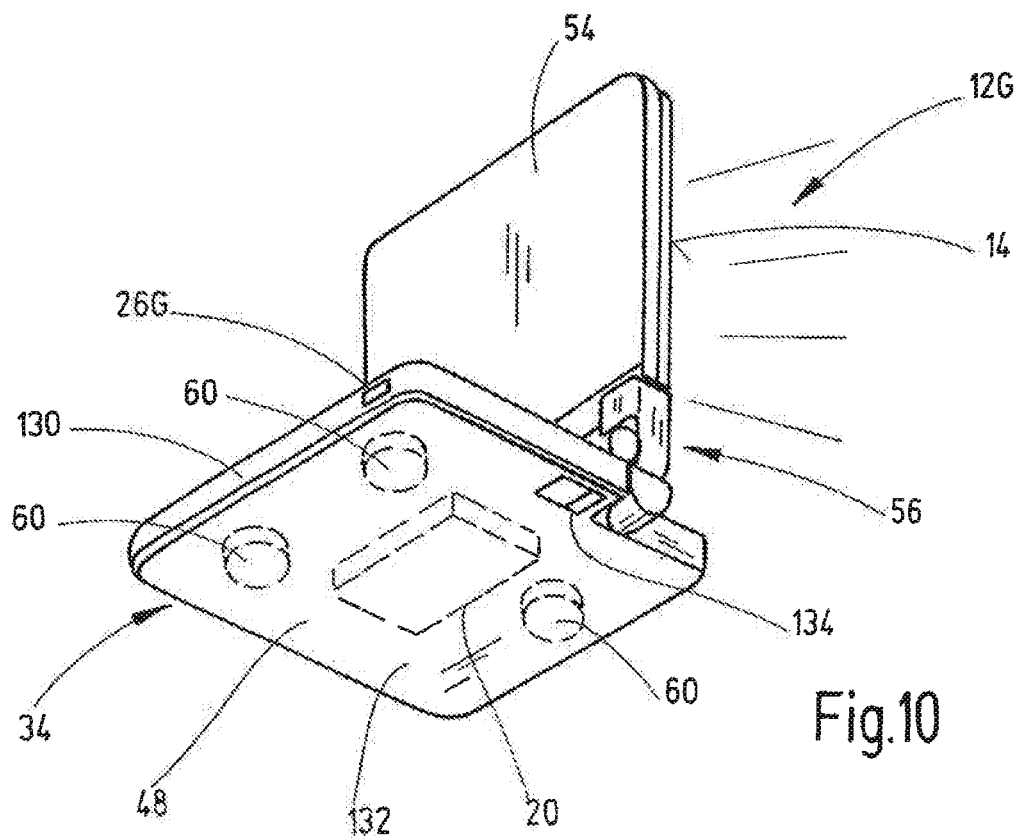
FIG. 10 shows a perspective illustration of the luminaire of FIG. 9 from below.

FIGS. 9 and 10 show a further embodiment of a luminaire 12G. The luminaire 12G has a body 16 with a foot 48 and a head 54, the head 54 being connected to the foot 48 via a joint 56. The head 54 can be constructed identically to the luminaire 12F of FIGS. 3 to 5. The rotational joint 56 can also be formed identically. The foot 48 preferably has dimensions similar to those of the head. The foot 48 and the head 54 can be oriented in a plane via the rotational joint 56, such that the luminaire 12G can be placed flat in a pocket.

The foot 48 constitutes a supporting/holding portion 34, since the luminaire 12G can be placed via the foot 48 on any surface. An interface arrangement 26G can also be formed on the foot 48 in order to charge an energy store 20 received in the foot 48. The interface arrangement 26G can be a micro USB interface, for example.

The head 54 has an upper side, on which the switching arrangement 30 is formed. The upper side is preferably formed from metal, in particular from an aluminum alloy. The lamp arrangement 40 can include an opaque panel, which is formed with holes, through which an array of LEDs illuminates.

The foot 48 has an upper shell 130, which is likewise preferably produced from a metal, in particular from the same type of metal as the upper part of the head 54. The foot 48 also has a lower shell 132, which is preferably produced from plastic. The upper shell 130 and the lower shell 132 preferably have an identical basic shape and enclose a volume, within which the energy store is received. One or more magnets can also be received within this volume so as to not only be able to set down the foot on a horizontal surface, but so as also to be able to secure the foot to a magnetizable or magnetic counter means.

An on/off switch 134 can also be formed on the lower shell 132, which switch interrupts the power supply between the lamp arrangement 14 and the energy store 20. The on/off switch 134 is formed in the present case is a mechanical switch, but could also be formed as a contact sensor 114, similar to that illustrated in FIG. 8.

A further embodiment of a luminaire 12H is shown in figures in 11 to 14 which can correspond in general in terms of structure and operating principle to the luminaires 12d in FIGS. 12 and 12F in FIGS. 2 to 5, a body 16H of the luminaire having a pillar-like main body 52, on which a handle 78 can be formed, as shown for example in FIG. 4, and at the upper end of which a luminaire head 54 can be fixed, in particular via a hinged connection 56.

Elements similar to those in the above-described embodiments are therefore designated by the same reference signs. Primarily the differences will be explained hereinafter.

It can be seen in FIG. 11 that a charge indicator or state of charge indicator is formed on the upper side of the foot 48H. The state of charge indicator 140 can indicate a state of charge of an electrical energy store 20 which is received in the foot 48H, as indicated schematically in FIG. 12. There, it can also be seen that an energy store cover 138 can be formed on the underside of the foot 48H, via which energy store cover the energy store 20, which can be formed in the manner of a rechargeable mobile telephone battery, can be replaced.

The state of charge indicator 140 can also have further features as have been described in the introduction.

The foot 48H has an underside 142, which defines a supporting plane, that is to say a plane over which the luminaire 12H is supported. Since the luminaire 12H is a freestanding luminaire, the supporting plane is oriented parallel to a horizontal.

An electrical connection arrangement 82H of an interface arrangement 26H of a charging device 22H is also illustrated in FIGS. 11 to 14. The connection arrangement 82H serves in this case to connect charging contacts 146 on a charging device housing 83H to luminaire contacts 148, which are formed on the foot 48H of the luminaire 12H. The connection arrangement 82 can also include one or more magnets in order to magnetically hold the connection arrangement 82H in the coupled position so that, on the one hand, a separation of the connection arrangement 82H is facilitated, but, on the other hand, a coupling can also be facilitated.

The connection arrangement 82H defines a connection axis 144, which in the present case is oriented transversely, in particular perpendicularly, to the supporting plane 142.

The connection axis 144 is defined by the direction in which the charging contacts 146 and the luminaire contacts 148 are brought into contact with one another or are to be aligned.

In the present case a recess 150 is provided on the foot 48H of the luminaire 12H, which recess is preferably formed below the region of the foot 48H from which the pillar-like main body 52 extends upwardly. The recess 150 is open to a side face 92H of the foot 48H and is also open to the underside 142 of the foot 48H.

The recess 150 has a recess cone 152, which is arranged concentrically with the connection axis 144. The recess cone 152 has a large diameter in the region of the underside 142 and tapers toward the upper side of the foot 48H. The recess cone 152 extends in the peripheral direction about the connection axis 144 over an angle of approximately 180°, more specifically on the side of the recess 150 arranged opposite the side face 92H. The luminaire contacts 148 lie within the recess cone 152.

The recess 150 also has an insertion bevel 154, which in particular can be seen in FIG. 14 and which starts from the side face 92H and tapers toward the recess cone 152.

The insertion bevel 154, in conjunction with the recess cone 152 and the fact that the charging contacts 146 and the luminaire contacts 148 are oriented concentrically with the connection axis 144, makes it possible for a charging device housing 83H extending in part into the recess 150 to pivot parallel to the underside 142 (supporting plane) through an angle 156 which lies in a range of from 10° to 90°, in particular in a range of from 15° to 45°. This makes it possible to produce the connection arrangement or the coupling of the contacts 146, 148 in a large number of different relative positions between foot 48H and charging device housing 83H.

As is shown in FIGS. 15 and 16, the charging device housing 83H preferably has a substantially cuboidal base 160, which at one longitudinal end has a cone extension 162, which defines a housing cone 164 which conically tapers from an underside of the charging device housing 83H and extends over an angle of greater than 180° and preferably less than 270°. The housing cone 164 is adapted in terms of dimensions and cone pitch to the recess cone 152 of the recess 150.

The cone extension 162 has, on its upper side, a flat circular face 166, which preferably protrudes toward an upper side of the base 160. As is shown in FIG. 16, a housing magnet part 168 can be provided on the circular face 166 and can cooperate with a soft-magnetic portion of the recess 150 in order to magnetically hold the connection arrangement in the manner of a magnetic dock.

A first charging contact 170 of the charging contacts 146 is also preferably provided on the circular face 166. The first charging contact 170 is formed as a circular central contact. A second charging contact 172, which is formed as a ring contact, is also formed on the circular face 166, more specifically concentrically with the first charging contact 170 and radially distanced herefrom.

The charging contacts 170, 172 form the above-described charging contacts 146 and correspond in terms of shape and arrangement to the luminaire contacts 148. One of the charging contacts 170, 172 can be a positive pole. The other charging contact can be a negative pole. A DC voltage can be provided via the charging contacts 170, 172 and is suitable for charging the energy store 20, for example a voltage in a range of from 4 to 24 volts.

An electrical standard interface 174, which can be formed as a computer interface, in particular as a USB interface, is formed on the longitudinal end of the base 160 opposite the cone extension 162. A plug of a standard charging cable 176 can be inserted into the interface 174, which in particular can be formed as a socket. The other end of the standard charging cable 176 can be connected to a standard charging converter 178, which for example can be inserted into a power outlet 58. The standard charging converter 178 converts the AC voltage provided at the power outlet 58 into a DC voltage, which can be guided via the standard charging cable 176 to the electrical standard interface 174. This charging voltage is tapped within the charging device housing 83H by contacts of the electrical standard interface 174 and can then be electrically connected to the charging contacts 170, 172.

The charging device housing 83H in this embodiment preferably does not have its own charging electronics. Rather, a standard charging converter 178 can be used to charge the energy store 20.

The charging device housing 83H is formed in particular so as to be arranged on a floor or flooring surface. An upper side of the base 160, which is designated in FIGS. 15 and 16 by 88H, can serve as a foot placement surface, similarly to that illustrated in FIG. 6.

In order to dock the luminaire 12H at the charging device housing 83H located on the floor, the luminaire is moved such that the recess 150 is approximately aligned with the cone extension 162. Due to the fact that the insertion bevel 154 is provided, and due to the fact that the housing cone 164 can cooperate with the recess cone 152, a centering is provided with respect to the connection axis 144, even if there is initially a certain misalignment. The cone extension 162 is also drawn magnetically against the "ceiling" of the recess 150 along the connection axis 144 on account of the housing magnet part 168 so as to thus electrically connect the charging contacts 146 to the luminaire contacts 148.

The dimensions of the recess 150 and of the cone extension 162 can be such that the charging device housing 83H still rests on a floor when the contacts 146, 148 are coupled. However, the charging device housing 83H can also be lifted slightly with respect to the floor, more specifically on account of the magnetic holding forces of the housing magnet part 168.

In order to separate the connection arrangement 82H, the luminaire can be lifted up, a foot preferably being placed on the base 160 so as to overcome the magnetic forces of the housing magnet part 168 during this process. If the luminaire is removed unintentionally from the power outlet 58 beyond the length of the standard charging cable 176, the unintentional forces occurring here can likewise release the magnetic holding forces, the connection arrangement being separable in this way without resulting in destruction. A separation of the connection arrangement 82H can thus likewise be facilitated.

The charging device housing 83H and foot 48H or recess 150 thereof can be coupled either by sliding the foot parallel to the underside 142 in the direction of the housing cone 164, or vice versa. Here, the contacts 146, 148 are firstly aligned in a direction parallel to the underside 142 or the supporting plane. However, contact is again made parallel to the connection axis 144, since the housing cone 164 is drawn into the recess cone 152 on account of the magnetic forces, more specifically parallel to the connection axis 144. A lateral approaching movement, which only at the end leads to the movement of charging device housing 83H and foot 48H along the connection axis 144, is indicated schematically in FIG. 13 by an arrow.

Of course, the foot 48H and charging device housing 83H can also be coupled and decoupled purely vertically, as is indicated schematically in FIGS. 11 and 12.

The luminaire arrangement shown in FIGS. 11 to 16 with the luminaire 12H and the charging device housing 83H, which is formed in the manner of a magnet dock, can be combined with any of the above-described embodiments. In particular, in addition to the electrical connection arrangement, an inductive interface arrangement can be provided. A wireless communications device can also be integrated, via which the portable luminaire can be switched or dimmed jointly with other luminaires. Lastly, a switching arrangement for actuating the luminaire can be constructed in a similar manner to that described with reference to FIG. 8.

The pillar-like main body 52 can be coupled to a luminaire head 54, as is illustrated in FIG. 5.

A luminaire family for a further embodiment of a luminaire arrangement is shown in FIGS. 17 to 24. The luminaires of FIGS. 17 to 24 correspond generally in terms of structure and operating principle to the above-described luminaires, more specifically in particular the luminaires 12B, 12D and 12E of FIG. 2. The luminaires of the luminaire family of FIGS. 17 to 24 are preferably wall luminaires, ceiling luminaires or pendant luminaires. The luminaires of FIGS. 17 to 24 preferably share magnetic holding technology in order to secure the luminaires to the wall, to the ceiling, or to a pendant.

In FIGS. 17 and 18 a first luminaire of this luminaire family is illustrated schematically and designated generally by 12I.

The luminaire 12I has a flat cuboidal body 180, which has a body front side 182 (FIG. 17) and a body rear side 184 (FIG. 18). The body rear side 184 forms a supporting plane, which lies parallel to a securing plane (wall or ceiling or the like).

A switching arrangement 30I, which can correspond in terms of structure and operating principle to the switching arrangement 30 as has been described with reference to the luminaire of FIG. 5 and the luminaire of FIGS. 9 and 10, can be provided on the body front side 182. A charge indicator 140I, via which a state of charge of an energy store 120I integrated in the body 180 can be queried or displayed, is also arranged on the body front side 182.

An electrical standard interface 174I is formed on a side face 92I and can be identical to the standard interface 174 of the charging device housing 83H of FIGS. 15 and 16 or to the interface 26G indicated schematically in FIGS. 9 and 10. In the present case the standard interface 174 forms part of an electrical interface 26I of this type.

The body 180 is connected on a longitudinal end opposite the side face 92I to a planar lamp or a luminous panel 186. The luminous panel 186 can be an opaque Plexiglas plate, for example, but can also be a glass plate with interspersed particles.

The luminous panel 186 is fed via a feed portion 182. In particular, light is coupled into a side edge (not shown) of the luminous panel 186. The feed portion 188 is arranged in the manner of a strip in the region between the body 180 and the luminous panel 186. The feed portion 188 preferably has a plurality of LEDs arranged along a strip form, which are fed from the energy store 20I.

The body 180 has a frame 190, which surrounds the luminous panel 186. In some cases, however, the frame 190 can also be omitted.

The luminous panel 186 with the frame 190 is angled relative to the body front side 182 and/or the body rear side 184 by an angle 192. The angle 192 can lie in a range of from 3° to 90°, in each case inclusive, and preferably lies in a range of from 15° to 45°, in each case inclusive.

The feed portion 188 can also be inclined with respect to the side face 92I by an angle (not specified in greater detail) in a range of from 5° to 60°. The feed portion 188, however, can also be oriented parallel to the side face 92I and/or perpendicularly to side faces arranged therebetween (not specified in greater detail).

Due to the angling of the luminous panel 186 relative to the body 180, it is possible, when the luminaire 12I is mounted on a wall or ceiling, for light to irradiate both from the surface of the luminous panel 186 facing toward the body front side 182 and from the opposite surface of the luminous panel facing toward the body rear side 184. Consequently, a lighting effect in the manner of direct and indirect light can be obtained, to name just one exemplary application for this.

A communications module 194 is also integrated in the body 180. The communications model can be, in particular, part of a wireless communications device 36K, as shown in FIG. 24. The communications module 194 can be connected for communication to other luminaires and/or to an operating device 66. It is preferably possible, via the communications device 36K, to switch and/or to dim a plurality of luminaires synchronously.

As can be seen in FIG. 18, the luminaire 12I also has, in the region of the body rear side 184, an on/off switch and a holding magnet arrangement 196.

The magnet holding arrangement 196 in the present case forms a magnet 60I for mounting the luminaire 12I on a wall or a ceiling. The holding magnet arrangement 196 here has a centering feature 198, by means of which the holding magnet arrangement 196 can be centered with respect to a magnetic securing part, which will be described hereinafter. The centering feature 198 can be, for example, a circular protrusion, which protrudes relative to the holding magnet arrangement 196.

In one embodiment the luminaire 12I can be set via the switching arrangement 30I to a master mode, in which the communications module 194 synchronizes all changes of the state of the luminaire 12I with a plurality of "slave" luminaires. Generally, however, the communications model 194 of the luminaire 12I is always a "slave" module, which can be controlled by means of a master in the form of an operating device 66K, as shown in FIG. 19.

The operating device 66K has an operating device body 202, which likewise can be formed as a flat, planar body, with a body rear side illustrated in FIG. 19, on which a holding magnet arrangement 196K can be formed, which is identical to the holding magnet arrangement 196 of FIG. 18.

An electrical energy store 20K can also be arranged in the operating device body 202. A standard interface 174K can also be provided on the operating device body 202 so as to be able to charge the energy store 20K in this way.

A communications module 194K is also formed in the operating device body 202 and is preferably formed as a "master" module and can be connected for communication to a plurality of luminaires (such as a plurality of luminaires 12I or also any other of the above-described luminaires) so as to control these synchronously.

A charge indicator 140K can be arranged on the front side (not shown in greater detail) of the operating device body 202, as can also a switching arrangement 30K. The switching arrangement 30K and the charging indicator 140K can be formed identically to the corresponding elements 30I and 140I of FIG. 17.

FIG. 20 shows a further embodiment of a luminaire 12L, which generally corresponds in terms of structure and operating principle to the luminaire 12I. Like elements are therefore designated by like reference signs. Primarily the differences will be explained hereinafter.

The luminaire 12L can preferably be temporarily secured to a pendant 206, more specifically preferably by means of a holding magnet arrangement 196L, which is formed on a rear side or upper side of the luminaire 12L, which is not visible in FIG. 20.

The luminaire 12L has a body 180L, which is preferably formed as a semi-circular plate. A switching arrangement 30L and a charge indicator 140L can be formed on an underside 182L of the body 180L and can correspond to the elements 30I and 140I of FIG. 17.

An electrical energy store 20L is also integrated in the body 180L, as is also a communications module 194L, which can be generally comparable in terms of structure and operating principle to the corresponding elements 20I, 194I of the luminaire of FIG. 17.

The luminaire 12L also preferably has a semi-circular luminous panel 186L, which is shaped such that the body 180L and the luminous panel 186L together define a circle, for example. Similarly to the embodiment of FIGS. 17 and 18, however, the luminous panel 186L is angled relative to the body 180L by an angle 192L, which can lie in an angular range similar to the above-described angle 192.

A semi-circular frame 190L can also be provided around the luminous panel 186L.

A feed portion 188L is provided between the body 180L and the luminous panel 186L, by means of which feed portion light can be coupled into a side edge of the luminous panel 186L. Light is preferably again emitted from a surface of the luminous panel 186L facing toward the underside 182L, and preferably also from a surface of the luminous panel 186L facing toward the upper side (not illustrated).

The pendant 206 can be formed for example by a single cable, which at its upper end is secured purely mechanically to a ceiling, for example. A magnetic securing part can be secured to the underside or the free end of the pendant, which magnetic securing part can cooperate with the holding magnet arrangement 196L (not shown in greater detail in FIG. 20). The holding magnet arrangement 196L is preferably secured to the upper side of the body 180L concentrically with a circle shape, which circle shape is defined by the body 180L and the luminous panel 186L. Consequently, the luminaire 12L can be secured to the pendant 206 such that the body 182L is preferably oriented horizontally.

FIGS. 21 and 22 show a magnetic securing part 210, as can be secured for example to a wall or to an end of a pendant 206. The magnetic securing part 210 has a main body formed from a soft-magnetic material, which is approximately circular and has a centering means 212 in the form of a circular axial indentation. The centering feature 198 of the holding magnet arrangement 196 can engage in this indentation or in this centering means 212, for example.

The magnetic securing part 210 preferably has a securing portion centrally, which for example can be formed by a bore, via which a screw 218 can be passed through. FIG. 22 shows that a screw of this type passes through the securing portion 214 and is fixed in a wall 46 at a wall plug (not specified in greater detail).

The magnetic securing part 210 can also preferably have a holding magnet mount 216, in which the holding magnet arrangement 196 can be completely received. An aesthetically pleasing magnetic connection can be established in this way.

FIG. 23 shows, in schematic form, a feed portion 188, which is formed in a strip-like manner with a plurality of LEDs (not specified in greater detail), which couple their light into a side face 220 of a luminous panel 186. By way of example, the luminous panel 186 can be formed as an opaque panel so that total internal reflection within the panel is avoided. However, particles can also be integrated in the panel 186 in order to be able to couple light out via the surfaces oriented perpendicularly to the side face 220.

FIG. 24 shows, in schematic form, a luminaire arrangement 10M, which for example includes a plurality of luminaires 12I and a luminaire 12L. The luminaire arrangement 10 also includes an operating device 66K, as shown in FIG. 19.

In FIG. 24 it can first be seen that, in the case of the luminaire 12L, a magnetic securing part 210 is fixed at an end of a pendant 206 and is fixed to the upper side of the body 180L by means of a holding magnet arrangement 196L. An on/off switch 200L can also be arranged on the upper side of the body 180L.

As indicated schematically by arrows 64, the luminaires 12I and 12L can be controlled synchronously by means of the operating device 66K.

In FIG. 24 the operating device 66K is shown attached to a standard charging cable 176. However, the operating device 66K can also be decoupled from a charging cable 176 of this type and can be temporarily fixed to a wall merely via its holding magnet arrangement 196K (FIG. 19).

The luminaires 12I, 12L of FIG. 24 and also the operating device 66K can each be removed from their place of temporary mounting by means of the magnetic securing part 210 and holding magnet arrangement 196 and can each be charged at a central charging location, more specifically via a standard charging converter 178 and a plurality of standard charging cables 176.

Figure 25:
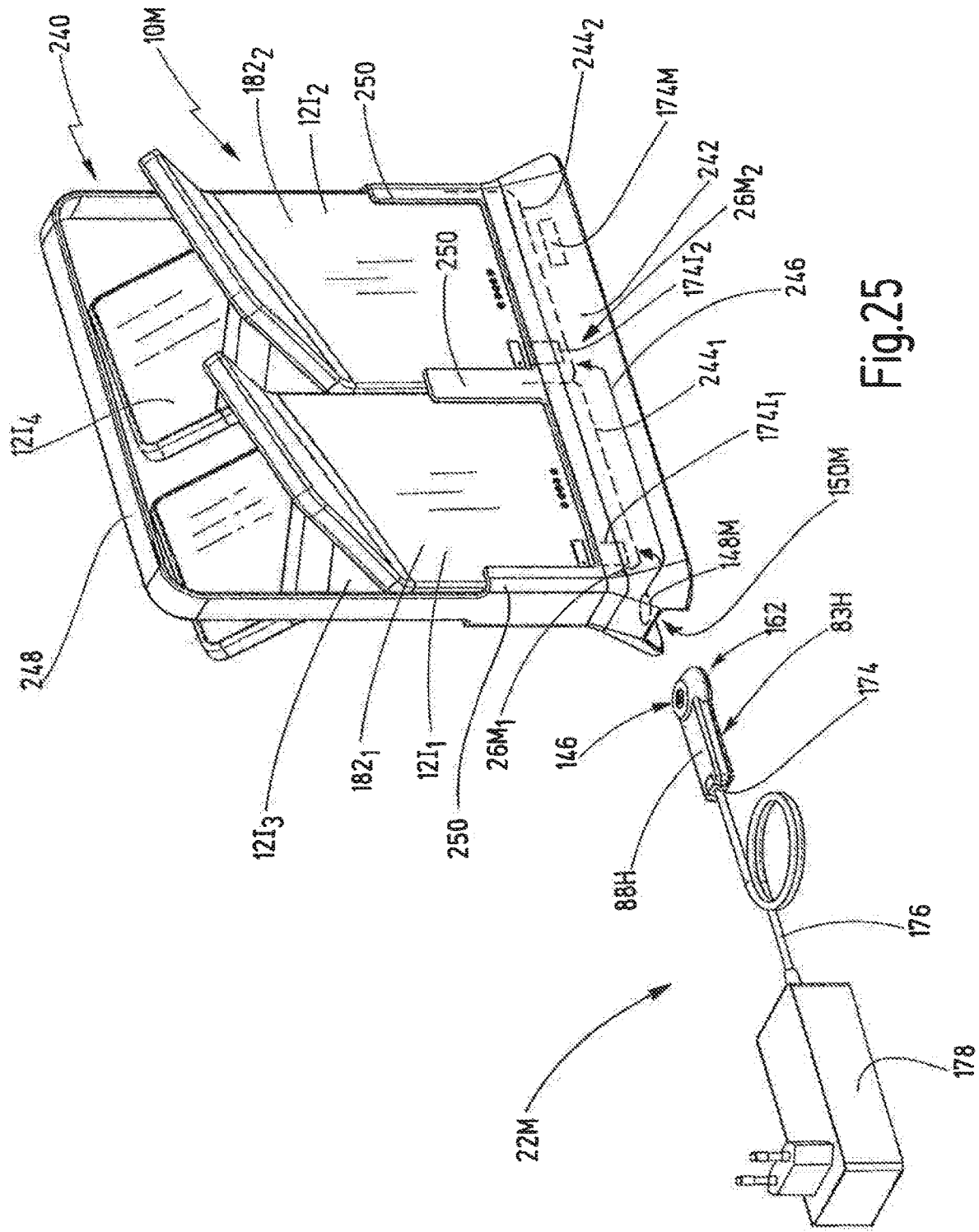
FIG. 25 shows a further embodiment of a charging device comprising a charging station for charging a plurality of luminaires.

FIG. 25 shows a preferred embodiment of a luminaire arrangement 10M with a charging device 22M, which has a charging station 240.

The charging station 240 includes a base 242, which example can be placed on a flat surface. A plurality of luminaire mounts 244 (in the present case four) for temporarily receiving a corresponding plurality of luminaires are also formed on an upper side of the base 242. In the present case the charging station 240 is designed to charge luminaires 12I, as are shown in FIGS. 17 and 18 and also in FIG. 24. The charging station 240 is preferably also suitable for recharging an operating device 66K, as is shown in FIG. 19. However, the charging station 240 can also be adapted such that it is suitable for recharging other types of luminaires, in particular luminaires which are formed as wall, ceiling, or pendant luminaires.

In the present case, four luminaire mounts 244 are formed on the base 242 and are designed to receive four luminaires $12I_1$, $12I_2$, $12I_3$ and $12I_4$ of the luminaire type shown in FIGS. 17 and 18.

Here, interface arrangements $26M_1$, $26M_2$, etc. are formed in the region of the luminaire mounts 244 and are designed to cooperate with the interfaces $174I_1$, $174I_2$, etc. provided on the luminaires 12I.

Wiring 246 is provided inside the base 242 and is designed to connect these interfaces $174I_1$, $174I_2$, etc. to a central charging interface, which is formed in the present case by "luminaire" contacts 148M on the upper side of a recess 150M formed in the bottom of the base 242.

The recess 150M corresponds in terms of structure and operating principle to the recess 150 shown in figures in 11 to 14 (in that case for the foot of a freestanding luminaire).

The same recess with the identical contacts 148M is provided in the present case on the base 242, such that the charging device housing 83H can be slid into the recess 150M via the cone extension 162. The charging device housing 83H is preferably structured identically to the charging device housing 23H of FIGS. 15 and 16.

Consequently, a standard interface 174 is provided at an end of the charging device housing 83H opposite the cone extension 162, into which standard interface a plug of a standard charging cable 176 can be inserted, said charging cable being connected at the other end to a standard charging converter 178.

Alternatively to the embodiment in which a recess 150M for receiving a portion of the charging device housing 83H is formed on the charging station 240, a standard charging interface 174M could also be provided on the charging station 240, into which standard charging interface a plug of the standard charging cable 176 could be directly inserted. In this case, this interface 174M would be connected in parallel with the interfaces $174I_1$, $174I_2$, etc. via a corresponding wiring.

Retaining struts 250 can be provided in order to mechanically fix the luminaires 12I to the charging station 240 and extend upwardly starting from the base 242 and form a mechanical part of the luminaire receptacles 244.

Furthermore, the recess 150M can be formed at any point in the region of the base 242. However, the recess 150M is preferably provided at an axial end of the base 242.

The axial direction of the base 242 preferably lies parallel to the body front sides $182_1$, $182_2$, etc. of the luminaires $12I_1$, $12I_2$, etc. inserted into the charging station 240.

The charging station 240 preferably also has a hoop or handle 248, which extends in a U-shaped manner above the base 242 and is connected to the axial end of the base. The hoop 248 is preferably longer than the height of the luminaires 12I inserted into the charging station 240 so that the charging station 240 with the luminaires 12I inserted therein can be easily carried by means of the hoop 248.

For coupling to the charging device housing 83H, the charging station 240 can be moved such that the mount 150M is moved into the vicinity of the cone extension 162, where the contacts 146 and 148M are contacted with automatic centering on account of the housing magnet part 168. To separate the charging station 240 from the charging device housing H, the upper side 88H of the charging device housing 83H can then be pressed by hand or by means of a foot in order to fix this and facilitate a removal of the charging station 240 from the charging device housing 83H.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A luminaire arrangement for providing lighting in or near buildings, comprising:
    at least one portable luminaire, which has a body and a lamp arrangement;
    at least one energy store, which is connected to the luminaire, is rechargeable, and is designed to supply electrical power to the lamp arrangement of the luminaire; and
    at least one charging device, which is designed to recharge the energy store,
    the energy store being attachable by means of an interface arrangement to the charging device in order to at least one of recharge the energy store or supply power to the lamp arrangement, and being separable from the charging device in order to take the luminaire as necessary to any target location to be lit, wherein the interface arrangement includes an electric connection arrangement, the electric connection arrangement being held magnetically in a connection position by magnetic forces of a magnet arrangement, wherein the electric connection arrangement is releasable against the magnetic force of attraction of the magnet arrangement such that establishing at least one of the electric connection arrangement or separation of the electric connection arrangement is facilitated;
    wherein a charging device housing of the charging device includes a cuboidal base which at one longitudinal end has a cone extension defining a housing cone, wherein the housing cone conically tapers from an underside of the charging device housing and extends over an angle of greater than 180° and less than 270°, wherein the cone extension has, on its upper side, a flat circular face on which a first charging contact and a second charging contact are provided, wherein the second charging contact is formed concentrically with the first charging contact and is radially distanced therefrom.

2. The luminaire arrangement as claimed in claim 1, wherein the charging device and the energy store can be coupled by means of an inductive interface arrangement such that the energy store can be charged inductively.

3. The luminaire arrangement as claimed in claim 1, comprising a plurality of portable luminaires, which each has a control arrangement, each control arrangement including a wireless communications device, which communications devices can communicate with one another such that the luminaires can be switched jointly.

4. The luminaire arrangement as claimed in claim 1, the body of the luminaire defining a supporting plane and the interface arrangement having the electrical connection arrangement with a connection axis which is oriented transversely to the supporting plane.

5. The luminaire arrangement as claimed in claim 4, wherein the body of the luminaire has a recess, in which at least a portion of a charging device housing can be inserted, the shape of the recess and the shape of the charging device housing being coordinated with one another such that the charging device housing can be pivoted relative to the body of the luminaire parallel to the supporting plane by an angle which lies in a range of from 10° to 90°.

6. The luminaire arrangement as claimed in claim 4, the electrical connection arrangement having two concentric luminaire contacts on the body of the luminaire and two corresponding concentric charging contacts on a charging device housing.

7. A luminaire arrangement for providing lighting in or near buildings, comprising:
- at least one portable luminaire, which has a body and a lamp arrangement;
- at least one energy store, which is connected to the luminaire, is rechargeable, and is designed to supply electrical power to the lamp arrangement of the luminaire; and
- at least one charging device, which is designed to recharge the energy store,
- the energy store being attachable by means of an interface arrangement to the charging device in order to at least one of recharge the energy store or supply power to the lamp arrangement, and being separable from the charging device in order to take the luminaire as necessary to any target location to be lit,
- wherein a charging device housing of the charging device includes a cuboidal base which at one longitudinal end has a cone extension defining a housing cone, wherein the housing cone conically tapers from an underside of the charging device housing and extends over an angle of greater than 180° and less than 270°, wherein the cone extension has, on its uupper side, a flat circular face on which a first charging contact and a second charging contact are provided, wherein the second charging contact is formed concentrically with the first charging contact and is radially distanced therefrom.

* * * * *